(12) United States Patent
Berzin et al.

(10) Patent No.: US 11,304,115 B2
(45) Date of Patent: Apr. 12, 2022

(54) NETWORK DEFINED EDGE ROUTING FOR AN APPLICATION WORKLOAD

(71) Applicant: Equinix, Inc., Redwood City, CA (US)

(72) Inventors: Oleg Berzin, Huntingdon Valley, PA (US); Robert J. Huey, Pleasanton, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

(21) Appl. No.: 16/949,063

(22) Filed: Oct. 12, 2020

(65) Prior Publication Data

US 2021/0297925 A1 Sep. 23, 2021

Related U.S. Application Data

(60) Provisional application No. 62/991,451, filed on Mar. 18, 2020.

(51) Int. Cl.
*H04W 40/04* (2009.01)
*H04W 40/32* (2009.01)
(Continued)

(52) U.S. Cl.
CPC .......... *H04W 40/04* (2013.01); *H04L 45/123* (2013.01); *H04L 45/124* (2013.01); *H04L 45/20* (2013.01);
(Continued)

(58) Field of Classification Search
CPC . H04W 40/04; H04W 28/0268; H04W 40/12; H04W 40/32; H04L 45/123;
(Continued)

(56) References Cited

U.S. PATENT DOCUMENTS 9,450,817 B1 *  9/2016  Bahadur ............. H04L 41/0806
9,886,267 B2    2/2018  Maheshwari et al.
(Continued)

FOREIGN PATENT DOCUMENTS

EP        2418802 A1    2/2012

OTHER PUBLICATIONS

Le Faucheur et al., "Use of Interior Gateway Protocol (IGP) Metric as a second MPLS Traffic Engineering (TE) Metric," Network Working Group, RFC 3785, May 2004, 8 pp.
(Continued)

*Primary Examiner* — Eunsook Choi
(74) *Attorney, Agent, or Firm* — Shumaker & Sieffert, P.A.

(57) ABSTRACT

Techniques are described for a network providing network defined edge routing for an application workload. For example, a controller receives element registration information for each module hosted on a set of interconnected edge data centers and for one or more network devices that interconnect the modules in the network; obtain one or more routing metrics of the network; compute, based on the element registration information and the one or more routing metrics, one or more paths mapped to respective traffic classes to route traffic via the set of interconnected edge data centers; receive a request to route traffic according to a traffic class; and in response, send, to the set of interconnected edge data centers, a response specifying a path of the one or more paths that is mapped to the traffic class to cause the set of interconnected edge data centers to route traffic according to the traffic class.

20 Claims, 11 Drawing Sheets

(51) Int. Cl.
*H04W 40/12* (2009.01)
*H04W 28/02* (2009.01)
*H04L 45/12* (2022.01)
*H04L 45/30* (2022.01)
*H04L 45/00* (2022.01)

(52) U.S. Cl.
CPC ....... *H04L 45/306* (2013.01); *H04W 28/0268* (2013.01); *H04W 40/12* (2013.01); *H04W 40/32* (2013.01)

(58) Field of Classification Search
CPC ..... H04L 45/124; H04L 45/20; H04L 45/306; H04L 45/30
See application file for complete search history.

(56) References Cited

U.S. PATENT DOCUMENTS

| | | | |
|---|---|---|---|
| 9,948,552 | B2 | 4/2018 | Teng et al. |
| 10,015,268 | B2 | 7/2018 | Rao |
| 10,659,362 | B1* | 5/2020 | Sellappa ................. H04L 45/28 |
| 2012/0071168 | A1* | 3/2012 | Tomici ................. H04W 40/04 455/445 |
| 2012/0224506 | A1 | 9/2012 | Gredler et al. |
| 2016/0212016 | A1* | 7/2016 | Vrzic ................. H04L 41/5051 |
| 2019/0230032 | A1* | 7/2019 | Landau ................... H04L 45/74 |
| 2019/0261260 | A1* | 8/2019 | Dao ....................... H04W 48/18 |
| 2020/0162371 | A1* | 5/2020 | Musku ................. H04L 45/302 |
| 2020/0296012 | A1* | 9/2020 | Paruchuri ............. H04L 43/028 |
| 2020/0296029 | A1* | 9/2020 | Shenoy ................... H04L 43/12 |
| 2020/0382387 | A1* | 12/2020 | Pasupathy ........... H04L 41/5019 |
| 2021/0067468 | A1* | 3/2021 | Cidon ................. H04L 61/2535 |
| 2021/0127351 | A1* | 4/2021 | Stojanovski ...... H04W 28/0268 |

OTHER PUBLICATIONS

Previdi et al., "IS-IS Traffic Engineering (TE) Metric Extensions," Internet Engineering Task Force (IETF), RFC 7810, May 2016, 18 pp.
U.S. Appl. No. 17/139,857, filed Dec. 31, 2020, naming inventors Berzin et al.
"Segment Routing," Cisco Systems, Inc., Retrieved Apr. 27, 2021 from: https://web.archive.org/web/20200123094639/http://www.segment-routing.net/, Jan. 23, 2020, 3 pp.
"Study on management and orchestration of network slicing for next generation network," 3rd Generation Partnership Project; Technical Specification Group Services and System Aspects; Telecommunication management; TR 28.801, v15.1.0, Release 15, Jan. 2018, 79 pp.
"System Architecture for the 5G System," 3rd Generation Partnership Project; Technical Specification Group Services and System Aspects; System architecture for the 5G System(5GS); TS23.501, v16.3.0, Release 16, Dec. 2019, 417 pp.
"Kubernetes," The Linux Foundation, Retrieved May 13, 2021 from; https://web.archive.org/web/20200122201830/https://kubernetes.io/, Jan. 22, 2020, 10 pp.
"Multi-access Edge Computing (MEC); Framework and Reference Architecture," ETSI GS MEC 003: V2 1.1, Jan. 2019, 21 pp.
Kekki et al., "MEC in 5G networks," ETSI White Paper No. 28, Jun. 2018, 28 pp.
"Driving Data to the Edge: The Challenge of Traffic Distribution," AECC Technical Report, Automotive Edge Computing Consortium (AECC), Technical Solution Working Group (WG2), Sep. 19, 2019, 48 pp.
Matsushima et al., "Segment Routing IPv6 for Mobile User Plane: draft-ietf-dmm-srv6-mobile-uplane-07," DMM Working Group, Internet-Draft, Nov. 4, 2019, 29 pp.
Filsfils, "SRv6," Cisco Systems, Inc., Retrieved May 13, 2021 from: https://web.archive.org/web/20200117171116/https://www.segment-routing.net/tutorials/2017-12-05-srv6-introduction/, Dec. 5, 2017, 79 pp.
Filsfils et al., "IPv6 Segment Routing Header (SRH): draft-ietf-6man-segment-routing-header-26," Network Working Group, Internet-Draft, Oct. 22, 2019, 32 pp.
Berzin, "Mobility Management Architecture and Modeling for Label Switched Networks (Mobility Label Based Network)," Ph.D. Thesis, Retrieved from: https://idea.library.drexel.edu/islandora/object/idea%3A3217, Mar. 2010, 238 pp.
International Search Report and Written Opinion of International Application No. PCT/US2020/067716, dated Feb. 25, 2021, 12 pp.
Filsfils et al., "Segment Routing Architecture," Internet Engineering Task Force (IETF), RFC 8402, Jul. 2018, 33 pp.
Filsfils et al., "Segment Routing Use Cases: draft-filsfils-spring-segment-routing-use-cases-01," Network Working Group, Internet-Draft, Oct. 21, 2014, 35 pp.
First Examination Report from counterpart Australian Application No. 2020435926 dated Jan. 12, 2022, 3 pp.

\* cited by examiner

NETWORK DEFINED EDGE ROUTING FOR AN APPLICATION WORKLOAD

CROSS REFERENCE

This application claims the benefit of U.S. Provisional Patent Application No. 62/991,451, filed on Mar. 18, 2020, the entire contents of which is incorporated by reference herein in its entirety.

TECHNICAL FIELD

The disclosure relates to computer networks and, more specifically, to engineering traffic flows within computer networks.

BACKGROUND

Networks may implement $5^{th}$ Generation (5G) standards to enable network capabilities that improve network characteristics such as latency, capacity, throughput and reliability. 5G networks include two parts, a 5G New Radio (5GNR) and a 5G core (5GC). 5GNR defines an air interface structure, antennae design (e.g., massive Multiple Input Multiple Output arrays (mMIMO)) and radio transmission methods (beamforming/beam steering). 5GNR increases data rates, decreases "air interface" latency, and improves capacity (e.g., number of connected devices). 5GC defines core control (signaling) and user plane (data) capabilities that make use of cloud native virtualization and enable features such as Control and User Plane Separation (CUPS) and network slicing.

5G networks provide significantly higher throughput than existing networks, such as $4^{th}$ generation of mobile networks ("4G") and 4G Long Term Evolution ("LTE"). Currently, 4G LTE is limited to around 150 Megabits per second (Mbps). LTE Advanced increases the data rate to 300 Mbps and LTE Advanced Pro to 600 Mbps-1 Gigabits per second (Gbps). In 5G networks, the downlink speeds may be up to 20 Gbps. 5G networks can use multiple spectrum options, including low band (sub 1 Giga Hertz (GHz)), mid-band (1-6 GHz), and mmWave (28, 39 GHz). The mmWave spectrum has the largest available contiguous bandwidth capacity (~1000 MHz). 5G networks enable advanced air interface formats and transmission scheduling procedures that decrease access latency in the Radio Access Network (RAN), such as by a factor of 10 compared to 4G LTE.

However, to achieve the improvements in key network characteristics (e.g., latency, capacity, throughput and reliability), improvements to the physical and logical infrastructure (e.g., RAN, edge data centers, packet/optical interconnection fabric, edge computing) are needed to enable the ability to deliver high-performing services on the 5G network.

SUMMARY

In general, techniques are described for a network providing network defined edge routing for an application workload. The network may implement 5G standards to deliver traffic with, for example, very low end-to-end latency. To enable the delivery of traffic in accordance with 5G standards, the network may include a physical aggregation infrastructure having a set of interconnected edge data centers (EDCs) that enable the infrastructure for physical aggregation points and for the delivery of one or more 5G capabilities (e.g., very low end-to-end latency). For example, the set of interconnected EDCs may implement 5G Radio Access Network (RAN) functions (e.g., Base Band Unit (BBU), Distributed Unit (DU), Centralized Unit (CU)), 5G Core (5GC) functions (e.g., User Plane Function (UPF)), and edge compute functions (also referred to herein as "edge compute (EC)" or "Mobile Edge Compute (MEC)").

Traffic may be routed from a Radio Access Network to a data network (e.g., via a mobile breakout point) and terminated on an application workload (e.g., Kubernetes container) that runs a corresponding application or service instance(s) within the data network. To reduce latency, an ideal physical location for the application workload is locally within a mobile edge compute infrastructure in the same edge data center that hosts RAN/5GC functions that services the mobile session providing connectivity for the traffic. In some instances, not all edge data centers are equipped with RAN functions, capable of accepting wireless connections from devices, and/or equipped with edge computing functions (e.g., some EDCs could be smaller Centralized RAN hubs without edge compute servers). In accordance with techniques described in this disclosure, the network provides network defined edge routing via a set of interconnected edge data centers to route traffic from an application workload in accordance with low-latency standards, such as 5G standards. A set of interconnected edge data centers may be configured as part of a single domain, referred to herein as an "MEC domain (MECD)" in which at least one edge data center in the MEC domain is equipped with edge compute resources. As one example, the network utilizes segment routing (SR) as a mechanism of end-to-end path identification and traffic forwarding within the MEC domain, coupled with methods of element-aware segment identification registration, identification and interworking between the 5G control plane, and optimized edge routing control.

In one example, techniques described herein may provide for a controller for the network that discovers the topology of the MEC domain and computes paths within the MEC domain that meet traffic class requirements as well as perform traffic engineering using segment routing mechanisms (e.g., Source Packet Routing in Networking (SPRING)). In the one or more examples described in this disclosure, the controller may receive registration information (referred to herein as "element registration information") of elements/modules hosted on edge data centers of the MEC domain that provide, for example, one or more RAN functions (DU/CU), one or more 5G core functions, one or more edge compute functions, and element registration information of network devices (e.g., routers) that interconnect the modules in the network. Using the element registration information, and link and network fabric path information based on routing metrics (e.g., latency) between the packet and optical domains, the controller may compute paths (e.g., segment routing label stacks) mapped to respective traffic classes to route traffic within the MEC domain of the network. In this way, traffic is routed along a path from the device to the application workload hosted by an edge compute based on traffic class requirements of a corresponding application for the application workload.

In one example, the techniques describe a method comprising: receiving, by a controller for a network comprising a metropolitan area data center and a set of interconnected edge data centers, element registration information for each of the modules hosted on the set of interconnected edge data centers and for one or more network devices that interconnect the modules in the network, wherein the set of interconnected edge data centers host modules providing one or more radio access network (RAN) functions, one or more 5th Generation of Mobile Networks (5G) core functions, and one or more edge computing functions for an application workload; obtaining, by the controller, one or more routing metrics of the network; computing, by the controller and based on the element registration information and the one or more routing metrics, one or more paths mapped to respective traffic classes to route traffic via the set of interconnected edge data centers; receiving, by the controller, a request to route traffic according to a traffic class of the respective traffic classes from a source edge data center of the set of interconnected edge data centers to a destination edge data center of the set of interconnected edge data centers; and in response to receiving the request to route traffic according to the traffic class, sending, by the controller and to the set of interconnected edge data centers, a response specifying a path of the one or more paths that is mapped to the traffic class to cause the set of interconnected edge data centers to route traffic according to the traffic class.

In another example, the techniques describe a method comprising: sending, by an edge data center of a plurality of edge data centers in a network, element registration information for each of the modules hosted on the edge data center, and for each network device hosted on the edge data center, wherein the plurality of edge data centers host modules providing one or more radio access network (RAN) functions, one or more 5th Generation of Mobile Networks (5G) core functions, and one or more edge computing functions for an application workload; receiving, by the edge data center and from a controller of the network, one or more paths that are mapped to respective traffic classes, wherein the one or more paths are computed based on the element registration information and one or more routing metrics of the network; and in response to receiving a packet that is to be routed according to a traffic class of the respective traffic classes, sending, by the edge data center, the packet along a path of the one or more paths that is mapped to the traffic class.

In another example, the techniques describe a system comprising: metropolitan area data center of a network configured to provide an application workload; a set of interconnected edge data centers of the network, wherein the set of interconnected edge data centers host modules providing one or more radio access network (RAN) functions, one or more 5th Generation of Mobile Networks (5G) core functions, and one or more edge computing functions for the application workload; and a controller of the network configured to: receive element registration information for each of the modules hosted on the set of interconnected edge data centers and for one or more network devices that interconnect the modules in the network; obtain one or more routing metrics of the network; compute, based on the element registration information and the one or more routing metrics, one or more paths mapped to respective traffic classes to route traffic via the set of interconnected edge data centers; receive a request to route traffic according to a traffic class of the respective traffic classes from a source edge data center of the set of interconnected edge data centers to a destination edge data center of the set of interconnected edge data centers; and in response to receiving the request to route traffic according to the traffic class, send, to the set of interconnected edge data centers, a response specifying a path of the one or more paths that is mapped to the traffic class to cause the set of interconnected edge data centers to route traffic according to the traffic class.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
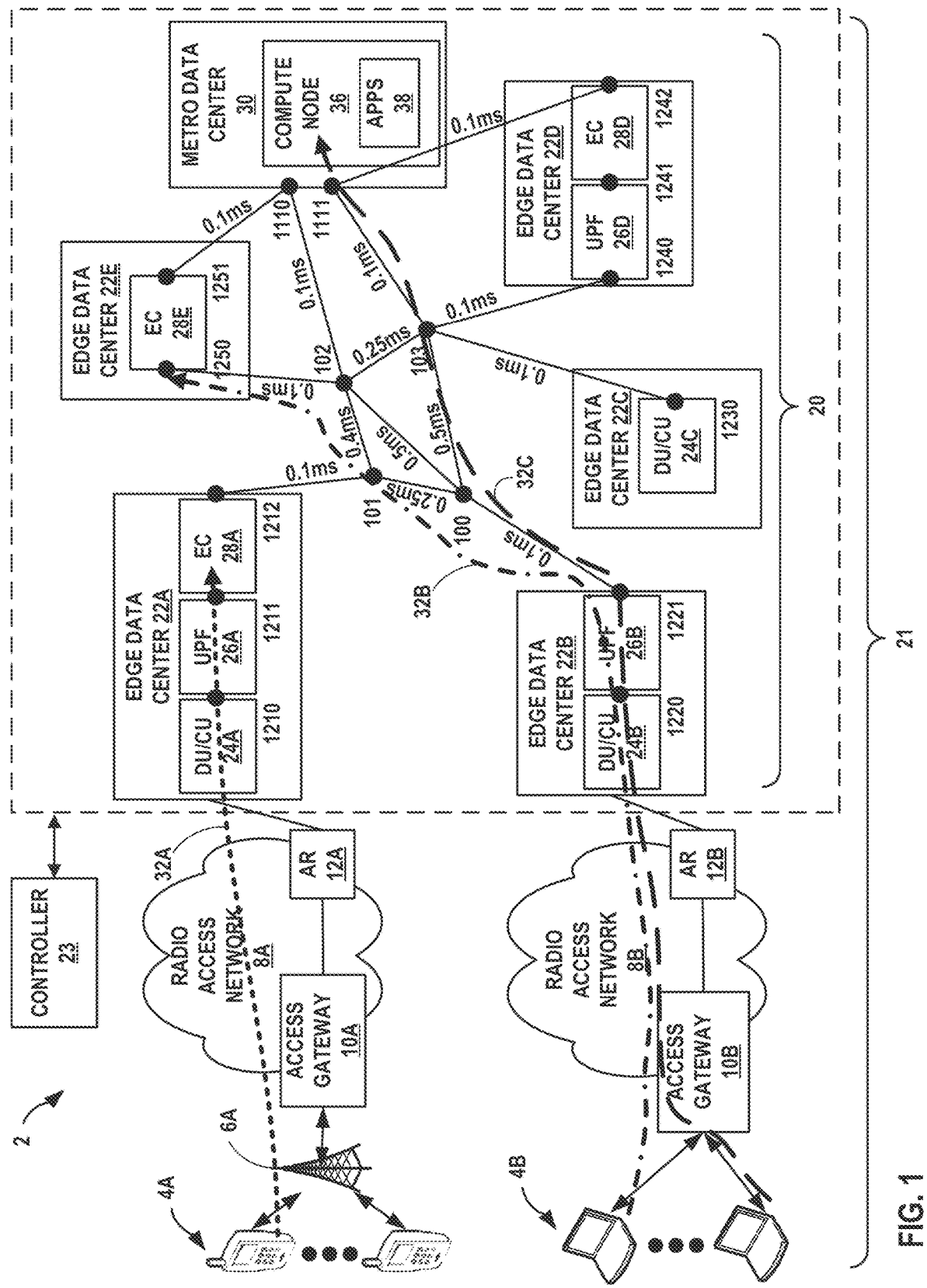
FIG. 1 is a block diagram illustrating an example network for providing network defined edge routing for an application workload, in accordance with the techniques described herein.

FIG. 1 is a block diagram illustrating an example network 2 for providing network defined edge routing for an application workload, in accordance with the techniques described herein. In the example of FIG. 1, network 2 includes a regional or metropolitan area data center 30 ("metro data center 30") that provides one or more applications or services 38 (referred to herein as simply "applications 38") for access by user devices 4A, 4B (collectively, "user devices 4" or "devices 4") via a set of interconnected edge data centers (EDCs) 22A-22E (collectively, "edge data centers 22" or "EDCs 22"). In some examples, applications 38 may be replicated on any of edge compute devices of EDCs 22, as further described below.

Devices 4 may include physical or virtual devices. For example, each of devices 4 may represent a desktop computer, laptop computer, tablet, smart phones, smart watches, rack-mounted server, other real or virtual server, and/or a container or virtual machine. In some examples, devices 4 may represent "Internet-of-Things" (IoT) devices, such as cameras, sensors, televisions, appliances, devices for transport and mobility, such as devices for traffic routing, telematics, package monitoring, smart parking, insurance adjustments, supply chain, shipping, public transport, airlines, and trains, for example.

As shown in FIG. 1, network 2 may include radio access networks (RAN) 8A-8B (collectively, "RANs 8") with access gateways 10A-10B (collectively, "access gateways 10") and access routers 12A-12B (collectively, "access routers 12"), respectively, that provide devices 4 with access to resources of EDCs 22 or metro data center 30. For example, devices 4A may support both cellular radio access and local wireless networks (e.g., WiFi) and may communicate with base station 6A over wireless links to access radio access network 8A. Similarly, devices 4B may communicate with access gateway 10B to access radio access network 8B. Radio access networks 8 may provide network access, data transport and other services to devices 4. In this example, radio access networks 8 may implement, for example, a 5th generation of mobile networks ("5G"). A 5G network provides improvements to previous generations of radio access networks, such as $4^{th}$ generation of mobile networks ("4G") and 4G Long Term Evolution ("LTE"). For example, 5G provides an air interface infrastructure, antennae design (e.g., for massive Multiple Input Multiple Output arrays or "mMIMO") and radio transmission methods (collectively referred to as "5G New Radio") that increases data rates, decreases "air interface" latency, and improvements in capacity (e.g., number of connected devices), among others. Additional information on 5G is described in 3GPP TS 23.501: "System Architecture for the 5G System," 3GPP, version 16.3.0, December 2019, the entire contents of which is incorporated by reference herein. Although the examples described in this disclosure are described with respect to a 5G network, the techniques described in this disclosure are applicable to any radio access network with low-latency requirements.

In some instances, devices 4 may access applications 38 provided by compute node 36 of metro data center 30. Metro data center 30 may represent a macro-edge data center. In some examples, metro data center 30 may represent a metro-based interconnection exchange made up of one or more co-location facilities within a single metropolitan area. For example, a co-location facility provider may employ one or more co-location facilities (otherwise referred to as "interconnection facilities"), e.g., metro data center 30, in which multiple customers (e.g., content providers) of the co-location facility provider may locate network, server, storage gear and interconnect to a variety of telecommunications, cloud, and other network service provider(s) with a minimum of cost and complexity. Metro data center 30 may have a switch fabric (not shown) configurable for cross-connecting customer networks located within multiple customer cages. In some instances, the customer cages may each be associated with a different customer of the interconnection facility provider. As used herein, the term "customer" of the interconnection system provider may refer to a tenant of the metro data center 30 deployed by the co-location facility provider, whereby the customer leases space within metro data center 30 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. Metro data center 30 may operate a network services exchange, such as Ethernet Exchange, and Internet Exchange, and/or a Cloud Exchange, for example, to transmit L2/L3 packet data between customer networks. Metro data center 30 may provide both an Ethernet exchange and a cloud-based services exchange, in some examples.

Further example details of a facility that provides a cloud-based services exchange are found in U.S. Pat. No. 9,948,522, filed Apr. 14, 2016 and entitled "Cloud-Based Services Exchange"; U.S. Pat. No. 9,886,267, filed Oct. 29, 2015 and entitled "INTERCONNECTION PLATFORM FOR REAL-TIME CONFIGURATION AND MANAGEMENT OF A CLOUD-BASED SERVICES EXCHANGE"; and in U.S. Provisional Patent Application 62/160,547, filed May 12, 2015 and entitled "PROGRAMMABLE NETWORK PLATFORM FOR A CLOUD-BASED SERVICES EXCHANGE"; each of which are incorporated herein by reference in their respective entireties.

Metro data center 30 may provide, for example, IoT intelligence, data analytics, device management and provisioning, data management, connectivity, event processing, and Application Programming Interface (API) controls to devices 4. For instance, metro data center 30 may provide access to applications 38 that include, for example, consumer, industrial, smart city, and/or vehicular applications. For example, metro data center 30 may include a server that provides an execution environment for an application workload (e.g., Kubernetes container) that runs a corresponding application or service instance(s), such as applications 38.

Metro data center 30 is connected to one or more edge data centers, e.g., edge data centers 22, via, for example, data center interconnect links (e.g., fiber optic links). Edge data centers 22 may represent micro-edge data centers connected to a regional data center, e.g., metro data center 30, to enable applications that rely on the existing regionally distributed metro infrastructure to connect to radio access networks 8. EDCs 22 may provide, for example, racks (i.e., including network switches, compute servers, storage arrays, etc.), power, cooling, fiber entry or exit, or other services or resources. In this example, EDCs 22 provide an infrastructure for the physical aggregation points and for providing one or more 5G capabilities, such as radio access network functions, 5G Core ("5GC") functions, computing resources such as a mobile edge compute (MEC) (also referred to as Multi-Access Edge Compute), and/or fiber aggregation. In the example of FIG. 1, EDCs 22 may host a 5G core that defines core control (signaling) and user plane (data) capabilities that make use of cloud native virtualization and enable features such as Control and User Plane Separation (CUPS) and Network Slicing. In this way, EDCs 22 enable 5G capabilities and computing resources located in proximity with each other and in proximity to end devices, e.g., devices 4.

In some examples, EDCs 22 may provide 5G capabilities of a 5G Service Based Architecture (SBA) as described in "3GPP TS 23.501: "System Architecture for the 5G System," the entire contents of which is incorporated by reference herein. A 5G Service Based Architecture may include user equipment ("UE") (e.g., devices 4), radio access network (e.g., radio access network 8), and a set of interconnected 5G network functions, such as user plane function ("UPF"), access and mobility function ("AMF"), session management function ("SMF"), policy control function ("PCF") and network slice selection function ("NSSF"). The 5G network functions may be referred to herein as "5G core functions."

A UPF handles uplink and downlink data forwarding between radio access network 8 and data networks. AMF is a control plane function responsible for registration of devices 4 and for session and mobility management. SMF is responsible for bearer and session management including the management of IPv4 and IPv6 addressing of devices 4. PCF is responsible for managing and authorizing session parameters for devices 4 including data rate, Quality of Service (QoS), and charging. NSSF is responsible for establishing and managing network slicing parameters for the device sessions including the 5G core and data transport domains. Each network function exposes its functionality, for example, through a Service Based Interface (SBI), which uses a REpresentation State Transfer (REST) interface using Hypertext Transfer Protocol (HTTP).

User equipment, e.g., devices 4, may be equipped with 5G New Radio (NR) capabilities. For example, devices 4 include an air interface structure, antennae design for massive Multiple Input Multiple Output (mMIMO) arrays, and radio transition methods (e.g., beamforming/beam steering) to provide increases in data rates, decreases in air interface latency, and improvements in capacity (e.g., number of connected devices).

EDCs 22 may provide one or more functions of a 5G radio access network. Functions of a 5G radio access network include radio units ("RUs"), distributed units ("DUs"), and centralized units ("CUs"), with the combination of DU and CU referred to as a Next Generation Node B (gNB). The radio units provide functions such as analog to digital conversion, filtering, power amplification and/or transmit/receive functionality. Radio units may be integrated with the antennae to use mMIMO. A distributed unit may represent a logical node that includes a one or more functions (i.e., a subset) of gNB and is controlled by the centralized unit via an interface (referred to as a "fronthaul interface"). Distributed units may be colocated with antennas. A centralized unit may represent a logical node that includes gNB functions not allocated to the distributed units. The gNB functions may include, for example, transfer of user data, mobility control, radio access network sharing, positioning, session management, and other network functions. These network functions may be referred to herein as "RAN functions."

In some examples, EDCs 22 may include an MEC infrastructure for hosting application workloads (e.g., Kubernetes container) that run application and/or service instances. For example, edge compute devices 28 may be located within edge data centers 22 that may also host 5G RAN functions and/or 5G core functions. In some examples, metro data center 30 may replicate applications 38 within any of edge computing devices 28 of edge data centers 22. In this way, an MEC infrastructure may enable the applications to be moved from a centralized data center (e.g., metro data center 30) to an edge data center, and is therefore closer to the end devices and reduces latency.

In some examples, certain application classes need to be routed according to certain traffic class requirements. Application classes may include, for example, applications requiring low latency and applications requiring a high data rate. A low latency class of applications may include applications providing critical services, such as collision avoidance or traffic look-ahead capability applications, Vulnerable Road User (VRU) applications that inform a vehicle of an imminent collision with a pedestrian, bicyclist, motorbike user, or the like. A high data rate class of applications may include applications requiring a high data rate, such as infotainment applications including video content delivery, general internet access, or other services such as intelligent parking and high-definition maps. Each traffic class may have a set of associated parameters including latency bound (e.g., round trip time), peak data rates, maximum error rate, reliability and restoration requirements, packet layer QoS, 5G QoS flow identifier (QFI), or similar parameters.

In certain examples, low latency class of applications should be routed on a path with the lowest latency from a radio access network and terminated on an application workload (e.g., a Kubernetes container). In these examples, an ideal physical location for such application workload is locally within the MEC infrastructure in the same EDC which hosts 5G radio access network functions and/or 5G core functions that services the mobile session providing connectivity for traffic of the application associated with the low latency class. However, not all EDCs may include 5G radio access network functions, 5G core functions, and/or edge computing functions. For example, some of EDCs 22 may be smaller Centralized RAN (CRAN) hubs without edge compute servers. In the example of FIG. 1, EDC 22A includes a distributed unit or centralized unit 24A ("DU/CU 24A"), user plane function 26A ("UPF 26A"), and edge compute 28A ("EC 28A"). On the other hand, EDC 22B includes DU/CU 24B and UPF 26B; EDC 22C includes DU/CU 24C; EDC 22D includes UPF 26D and EC 28D; and EDC 22E includes EC 28E. FIG. 1 is only one example, and may include any number of edge data centers with different infrastructures.

To route traffic according to low-latency requirements of a 5G network, the techniques described in this disclosure provide network defined edge routing for an application workload. For example, network 2 includes a controller 23 that may compute paths within a set of interconnected edge data centers that define a geographic zone or "domain" of mobile edge computes (referred to herein as "MEC domain 21") that meet traffic class requirements as well as performing traffic engineering using, for example, segment routing (SR) techniques, such as by using a Source Packet Routing in Networking (SPRING) paradigm. To perform segment routing, a network device (e.g., router) steers a packet through an ordered list of instructions, called "segments," such as one or more labels in a label stack ("segment list"), to a packet, and intermediate routers along the path remove labels from the label stack applied to the packet as the packet is forwarded through the network. Additional details of segment routing are further described in Filsfils et. al., Filsfils, ed., et al., "Segment Routing Architecture, Internet Engineering Task Force, Request for Comments 8402, July 2018, while Segment Routing use cases are described in Filsfils et. al., "Segment Routing Use Cases," Internet-Draft draft-filsfils-spring-segment-routing-use-cases-01, Oct. 21, 2014.

In some examples, controller 23 may construct the paths with a degree of granularity. For example, controller 23 may construct a path matrix that lists all possible paths linking all possible source-destination pairs within MEC domain 21 such as between EDCs 22, between any of DU/CUs 24 and any of UPFs 26, and/or between any of UPFs 26 and any of ECs 28.

According to the disclosed techniques, controller 23 may create paths based on element registration information provisioned, for example, during initial configuration of the network. For example, modules hosted on edge data centers 22 in MEC domain 21 that provide RAN functions (e.g., DU/CUs 24), 5G core functions (e.g., UPFs 26), and/or ECs 28 are registered with controller 23. Network devices such as routers or switches (illustrated in the example of FIG. 1 as black circles) that interconnect the modules that provide the RAN functions, 5G core functions, and ECs 28 are also registered with controller 23 (e.g., by advertising node segment identifiers (SIDs) of the network devices). Similarly, all transport routers and optical nodes within the packet/optical interconnection fabric 20 ("interconnection fabric 20" or "MEC domain fabric 20") that interconnects EDCs 22 may register with controller 23. Controller 23 may assign identifiers, such as segment identifiers (SIDs) to each of the modules that provide the RAN functions, 5G core functions, and ECs 28.

Figure 2:
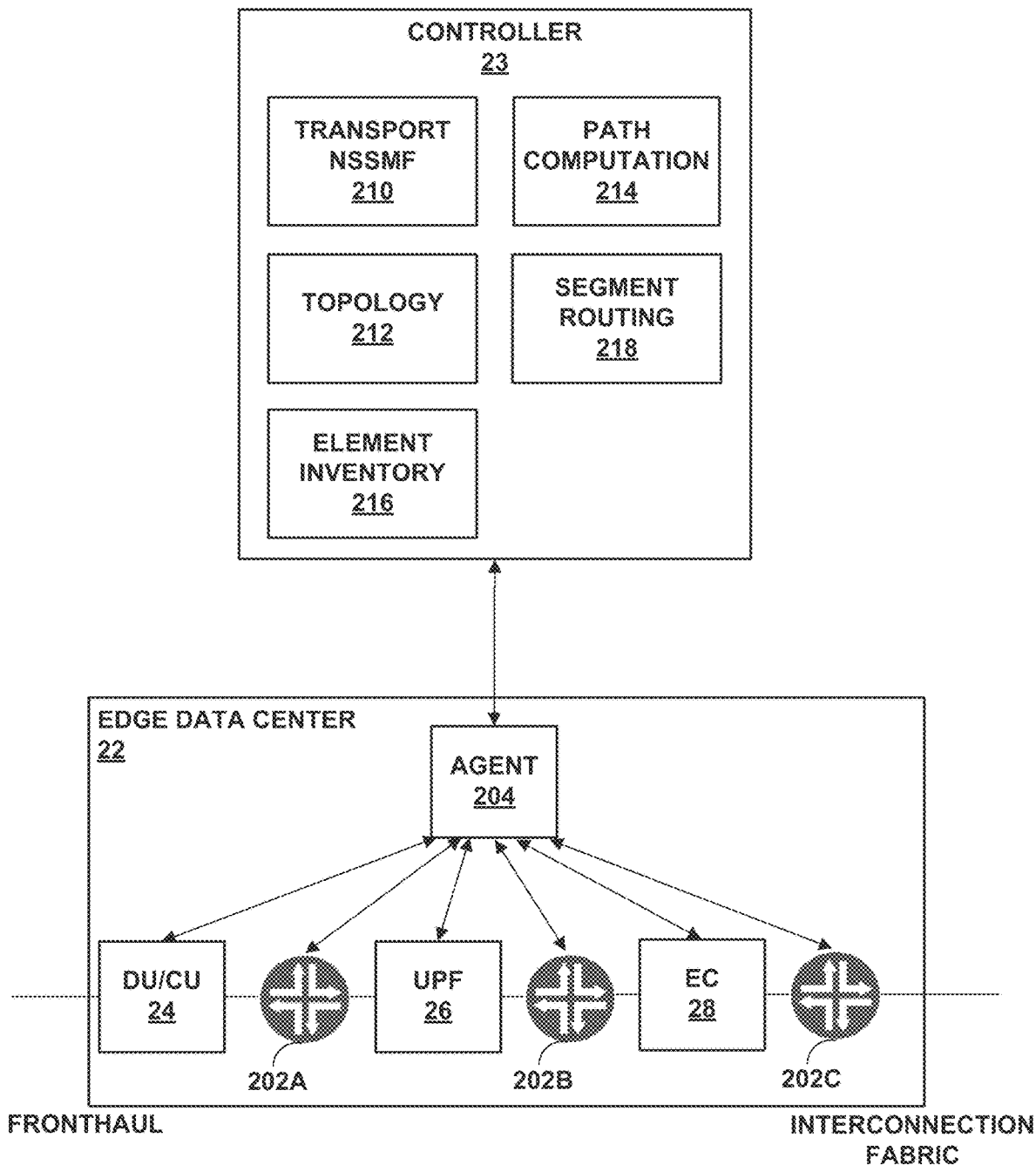
FIG. 2 is a block diagram of a controller and edge data center in further detail, in accordance with the techniques described in this disclosure.

Controller 23 may, in response to receiving the element registration information, generate and store an EDC element registration information record for each of EDCs 22 (as further described in FIG. 2). The EDC element registration information record may include an identifier for a respective edge data center, a segment identifier for each module hosted on the respective edge data center, and a segment identifier for each network device hosted on the respective edge data center. As one example, controller 23 may generate an EDC element registration information record for EDC 22A that may include an identifier for EDC 22A, a segment identifier 1210 for DU/CU 24A, a segment identifier 1211 for UPF 26A, a segment identifier 1212 for EC 28A. Similarly, controller 23 may generate an EDC element registration information record for EDC 22B that may include an identifier for EDC 22B, a segment identifier 1220 for DU/CU 24B, and a segment identifier 1221 for UPF 26B.

Controller 23 may use the segment identifiers in the EDC element registration records to construct network paths expressed as segment routing label stacks. For example, controller 23 may encode a SID as a Multi-Protocol Label Switching (MPLS) label, and encode an ordered list of SIDs as a stack of segment routing labels. In some examples, the segment routing labels may be implemented as SRv6 128-bit labels.

Controller 23 may map the network paths with application traffic classes. Traffic classes may include latency bounds, peak data rates, maximum error rate, reliability and restoration requirements, packet layer Quality of Service (QoS), 5G QoS Flow Identification (QFI), etc. As one example, controller 23 may assign a low latency class for applications providing critical services, such as Cellular Vehicle to Infrastructure (C-V2I) congestion avoidance or traffic look-ahead capability, or a Vulnerable Road User (VRU) application that provides a vehicle with information of an imminent collision. As another example, controller 23 may assign a high data rate class for applications that provide infotainment, such as video content delivery, internet access, or other services such as intelligent parking and high-definition maps.

Controller 23 may collect network fabric path information based on the link and routing metrics between the packet and optical domains to construct network paths that meet the traffic class requirements. Routing metrics may include latency, bandwidth, hop count, link utilization, reliability, throughput, load, packet loss, etc. For example, network devices may use network performance measurement protocols, such as One-way Active Measurement Protocol (OWAMP), Two-way Active Measurement Protocol (TWAMP), Simple Network Management Protocol (SNMP), and/or other protocols and techniques. Controller 23 may also identify path parameters of the interconnection fabric 20, such as span latencies, capacity (i.e., bandwidth), protection state, and others.

In the example of FIG. 1, the link between a network device within edge data center 22A (e.g., router with node SID 1212) to a network device (e.g., router with node SID 101) in the interconnection fabric 20 has a latency of 0.1 milliseconds (ms); the link between a network device with node SID 101 and a network device with node SID 102 has a latency of 0.4 ms; the link between a network device with node SID 102 and a network device within metro data center 30 (e.g., router with node SID 1110) has a latency of 0.1 ms; and so on. Using the link and routing metrics of the network (e.g., latency in this example), controller 23 may define paths mapped to traffic classes (e.g., low latency class in this example) so that the paths within the MEC domain 21 can be contained within expected performance bounds.

In the example of FIG. 1, controller 23 may compute paths 32A-32C (collectively, "paths 32") that meet different traffic class requirements and perform traffic engineering using source routing based on segment routing labels. For example, controller 23 may compute paths 32 based on EDC element registration information records of edge data centers (EDCs) 22 and the routing metrics. As one example, edge compute 28A of EDC 22A may host a first application workload that runs an application having traffic associated with a low latency class. Since the first application workload is local within the same EDC which hosts 5G radio access network functions and/or 5G core functions that services the mobile session providing connectivity for traffic of the application associated with the low latency class (and therefore the scenario with the lowest latency), controller 23 may, in this example, compute path 32A to route traffic from device 4A to edge compute 28A. For example, controller 23 may generate a stack of segment routing labels as {1210, 1211, 1212} to steer the traffic from device 4A to edge compute 28A. Traffic forwarded along path 32A is forwarded to network devices within edge data center 22A having node SIDS associated with the label stack. Controller 23 may map the segment routing label stack to a low-latency traffic class. In this way, traffic for a low-latency class of applications may be steered along path 32A, which traverses DU/CU 24A, UPF 26A, and EC 28A of EDC 22A.

In another example, edge compute 28E of EDC 22E may host a second application workload that runs an application having traffic associated with a low latency class. In this example, the second application workload is not local within the same EDC which hosts 5G radio access network functions and/or 5G core functions that services the mobile session providing connectivity for traffic of the application associated with the low latency class. Given the link and routing metrics, controller 23 may, in this example, compute path 32B to route traffic from device 4B to DU/CU 24B and UPF 26B in EDC 22B to EC 28E of EDC 22E, via network devices in interconnection fabric 20, which has the lowest latency. For example, controller 23 may generate a stack of segment routing labels as {1220, 1221, 100, 102, 1250} to steer the traffic from device 4B to edge compute 28E. Traffic forwarded along path 32B is forwarded to network devices within edge data center 22B (e.g., node SIDs of 1220, 1221), network devices in the interconnection fabric (e.g., node SIDs of 100, 102), and a network device within edge data center 22E (e.g., node SID 1250).

In yet another example, compute node 36 of metro data center 30 may host a third application workload that runs an application (e.g., application 38) having traffic associated with a low latency class. In this example, the third application workload is not local within the same EDC which hosts 5G radio access network functions and/or 5G core functions that services the mobile session providing connectivity for traffic of the application associated with the low latency class. Given the link and routing metrics, controller 23 may, in this example, compute path 32C to route traffic from device 4B to DU/CU 24B and UPF 26B in EDC 22B to compute node 36 of metro data center 30 via network devices in interconnection fabric 20, which has the lowest latency. For example, controller 23 may generate a stack of segment routing labels as {1220, 1221, 100, 103, 1111} to steer the traffic from device 4B to compute node 36. Traffic forwarded along path 32C is forwarded to network devices within edge data center 22B (e.g., node SIDs of 1220, 1221), network devices in the interconnection fabric (e.g., node SIDs of 100, 103), and a network device within metro data center 30 (e.g., node SID of 1111).

In this way, by grouping the edge data centers 22 as part of a MEC domain and collecting element registration information within the network, controller 23 may, based on link and routing metrics collected from the packet and optical domains and the element registration information of the MEC domain, compute network paths according to respective traffic classes in compliance with 5G network requirements and provide the computed network paths to devices 4 such that devices 4 may send traffic for an application workload along the computed paths within the MEC domain.

FIG. 2 is a block diagram of a controller and an edge data center in further detail, in accordance with the techniques described in this disclosure. In the example of FIG. 2, edge data center (EDC) 22 may represent an example instance of any of EDCs 22 of FIG. 1. EDC 22 of FIG. 2 is only one example instance of an EDC and may alternatively include (or exclude) any of the RAN functions (e.g., DU/CU), user plane function, and/or edge compute. Controller 23 may represent an example instance of controller 23 of FIG. 1.

EDC 22 includes modules that provide one or more RAN functions, one or more 5G core functions, and/or one or more edge computing functions. In this example, EDC 22 includes DU/CU 24 that provides RAN functions, UPF 26 that provides 5G core functions, and EC 28 that provides edge computing functions. EDC 22 includes network devices, such as routers 202A-202C (collectively, "routers 202") to communicate between modules of EDC 22 and/or to communicate to the interconnection fabric 20. For example, DU/CU 24 is communicatively coupled to UPF 26 via router 202A, and UPF 26 is communicatively coupled to EC 28 via router 202B. Router 202C of EDC 22A may represent a router to communicate with interconnection fabric 20. Router 202C may be referred to herein as an "interconnection fabric router" or "MECD fabric router."

Each of the elements of EDC 22 may register with a local agent, e.g., agent 204. For example, DU/CU 24, UPF 26, EC 28, and routers 202A-202C within EDC 22 may register with agent 204. Agent 204 may assign identifiers for each of the registered elements and sends EDC element registration information, such as an EDC identifier and an element identifier, to controller 23. For example, agent 204 may send an eXtensible Messaging and Presence Protocol (XMPP) message or other communication protocol message, including the EDC element registration information to controller 23.

In response to receiving the EDC element registration information, the element inventory module 216 of controller 23 may generate an EDC element registration record for each of the EDCs in the MEC domain. The EDC element registration record may include an identifier for a particular EDC and segment routing identifiers (e.g., node SIDs) assigned to the registered elements within the EDC. For example, controller 23 includes an element inventory module 216 that assigns segment routing segment identifiers (e.g., node SID) for each of the registered elements. An example EDC element registration record for EDC 22, such as EDC 22A of FIG. 1, is shown below:

```
{
"EDC ID": "EDC1",
"Element List": {
    "MECD Fabric Router": ["Node SID": 1212],
    "CU": ["Node SID": 1210],
    "EDC Router CU-UPF": ["Node SID": 1210],
    "UPF": ["Node SID":1211],
    "EDC Router UPF-EC": ["Node SID": 1211],
    "EC": ["Node SID": 1211]
    }
}
```

In the above example, the EDC element registration record for EDC 22 (identified by the identifier "EDC1") includes segment identifiers for modules DU/CU 24, UPF 26, and EC 28, and identifiers (e.g., segment routing identifiers) for routers 202. The EDC element registration record may be stored in a data structure, e.g., segment identifier database, such as in element inventors 216.

Controller 23 may include Network Slice Selection Management Function (NSSMF) module 210 that manages and orchestrates network slice selection instances (NSSI) for a particular device. In the example of FIG. 2, NSSMF module 202 may receive a request to provide network defined edge routing for an application workload that includes a traffic class identifier, DU/CU identifier, UPF identifier, and QoS flow identifier (QFI). NSSMF module 202 may receive the request using Multiprotocol Border Gateway Protocol (MP-BGP) or a REpresentational State Transfer Application Programming Interface (REST API). NSSMF module 210 may also respond to the request to provide network defined edge routing for an application workload with a segment routing label stack from the traffic class mapping structure, as described below.

Controller 23 may also include topology module 212 that is responsible for topology discovery of MEC domain 21, path computation module 214 to compute paths within the MEC domain, and segment routing module 218 for segment routing label assignments (as described above). For example, topology module 212 may use routing protocols (e.g., Border Gateway Protocol (BGP), Interior Gateway Protocol (IGP) or other routing protocols) to determine the topology of the interconnection fabric 20.

Path computation module 214 may compute paths that meet traffic class requirements. For example, path computation module 214 may collect network fabric path information based on the link and routing metrics between the packet and optical domains. As one example, controller 23 may use a link-state protocol, such as IGP, to receive IGP messages including path computation information that may include traffic engineering metrics, delay, IGP metrics, and others. IGP may include Open Shortest Path First (OSPF) or Intermediate System to Intermediate System (IS-IS). Additional examples of IGP metrics are described in F. Le Faucheur, et al., "Use of Interior Gateway Protocol (IGP) Metric as a second MPLS Traffic Engineering (TE) Metric," Request for Comments 3785, May 2004, the entire contents of which is incorporated by reference herein. Additional examples of other metrics are described in S. Previdid, Ed., et al., "IS-IS Traffic Engineering (TE) Metric Extensions," Request for Comments 7810, May 2016, the entire contents of which is incorporated by reference herein. In some examples, an IGP message may also include a path constraint that includes topology related constraints, such as excluded links/nodes, color-coded exclusions or inclusion for certain Quality of Service (QoS) or Service Level Agreement (SLA) groups (e.g., certain nodes or links are only used for traffic having a higher QoS or certain SLA), and others.

Using the EDC element registration record and the collected link and routing metrics, path computation module 214 may compute paths within the MEC domain that meet expected performance bounds. For example, path computation module 214 may use, for example, Constrained Shortest Path First (CSPF) or other path computation algorithms. The paths may be defined by a stack of labels (e.g., segment identifiers) from EDC element registration record. Path computation module 214 may also generate a traffic class mapping structure that maps traffic classes (e.g., low latency class or high data rate class) to one or more computed paths contained within expected performance bounds and within the MEC domain. For example, path computation module 214 may define traffic classes, each including one or more paths defined by a label stack of segment identifiers from the EDC element registration record. An example traffic class mapping structure is shown below:

```
{
"MECD": "MEC Domain1",
    "EDC 1": {
        "Traffic Class": {
            "Class0": {
                "Path0": {
                    "LabelStack": {
                        "UplinkDirection": {
                            "CU_Label": "Null", "UPF_Label": 1211, "EC_Label": 1212},
                        "DownlinkDirection": {
                            "CU_Label": 1210, "UPF_Label": 1211, "EC_Label": "Null"}},
        "Class1": {
            "Path0": {
                "LabelStack": {
                    "UplinkDirection": {
                        "CU_Label": "Null", "UPF_Label": 1211, "R_Label": 1212,
                        "R_Label":101, "R_Label":102, "EC_Label":1250},
                    "Downlink Direction": {
                        "CU_Label":1210, "UPF_Label":1211, "R_Label":1212,
                        "R_Label":101, "R_Label":102, "EC_Label":"Null"}},
            "Path1": {
                "LabelStack": {
                    "UplinkDirection": {
                        "CU_Label": "Null", "R_Label": 1212, "R_Label": 101,
                        "R_Label": 102, "R_Label": 103, "UPF_Label": 1240, "EC_Label": 1241},
                    "DownlinkDirection": {
                        "CU_Label": 1210, "R_Label": 1212, "R_Label": 101,
                        "R_Label": 102, "R_Label": 103, "UPF_Label": 1240, "EC_Label":"Null"}}
                }
            }
        }
}
```

In the example traffic class mapping structure shown above, "MEC Domain1" may represent MEC domain 21, and "EDC1" may represent a particular EDC 22, e.g., EDC 22A. The example traffic class mapping structure includes traffic classes, e.g., "Class0" and "Class1," each with one or more paths. In this example, "Class0" may represent a low latency class that is mapped to "Path0." When NSSMF module 210 receives a request to provide network defined edge routing for a low latency class of applications, NSSMF module 210 may return a segment routing label stack (e.g., upstream and/or downstream label stack) of "Path0" that is mapped to "Class0." "Class1" may represent a high data rate class that is mapped to "Path0" and "Path1." When NSSMF module 210 receives a request to provide network defined edge routing for a high data rate class of applications, NSSMF module 210 may return a segment routing label stack of "Path0" and/or "Path1" that is mapped to "Class1."

Figure 3:
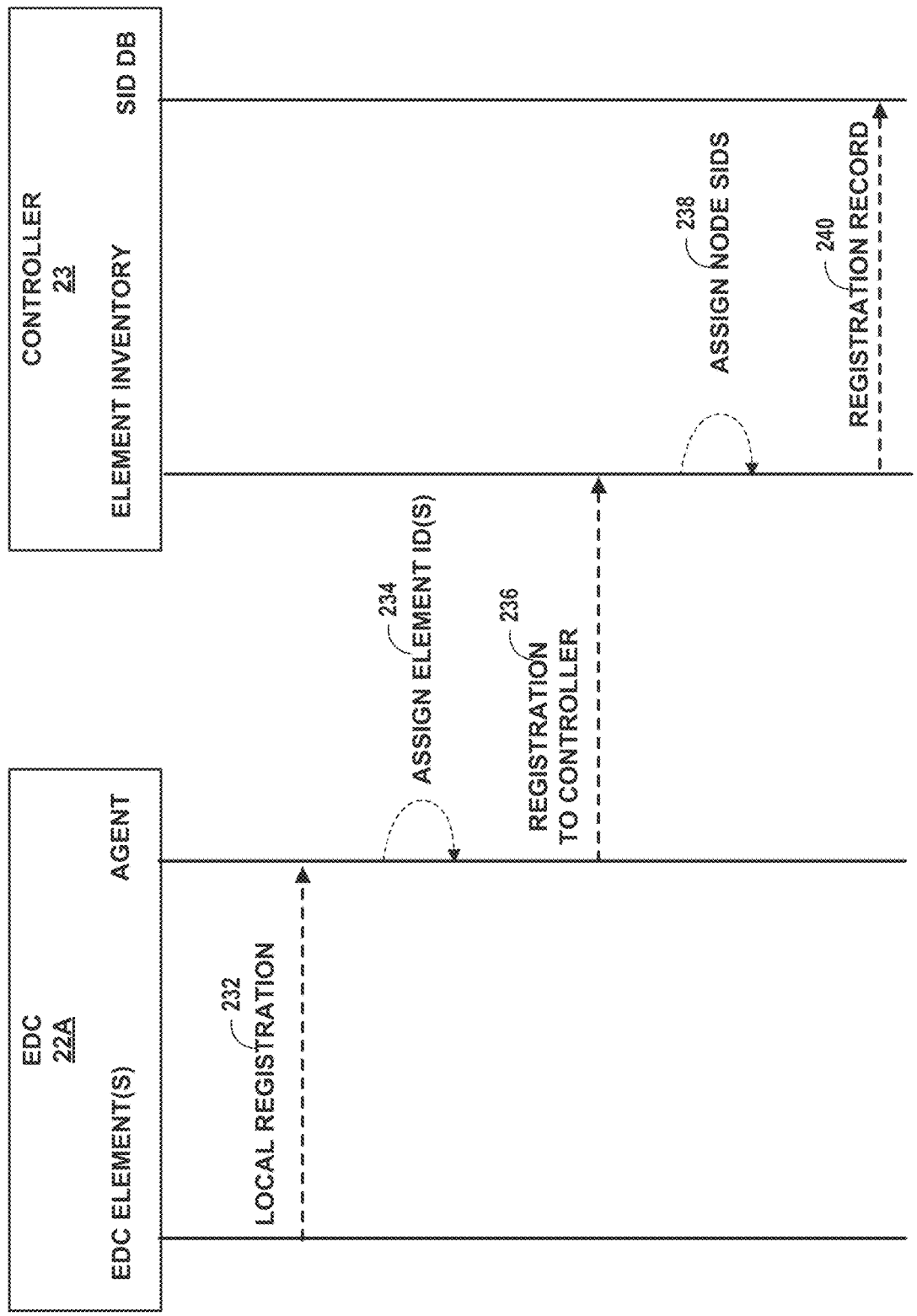
FIG. 3 is a block diagram illustrating an example operation of network element registration, in accordance with the techniques described in this disclosure.

FIG. 3 is a flowchart illustrating an example operation of edge data center element registration, in accordance with the techniques described in this disclosure. The example of FIG. 3 is described with respect to edge data center (EDC) 22A and controller 23 of FIGS. 1 and 2.

In the example of FIG. 3, modules of EDC 22A (e.g., DU/CU 24A, UPF 26A, EC 28A, routers 202) register with a local agent 204 of EDC 22A (232). Agent 204 assigns identifiers for the EDC and elements of the EDC (234). Agent 204 of EDC 22A sends the EDC element registration information (e.g., EDC ID, element IDs) to controller 23 (236). In response to receiving the EDC registration information, element inventory module 216 of controller 23 assigns segment routing identifiers (e.g., node SIDs) for the registered EDC elements (238) and generates an EDC element registration record with the segment routing identifiers. Element inventory module 216 stores the EDC element registration record in a data structure (e.g., SID database) of controller 23 (240).

Figure 4:
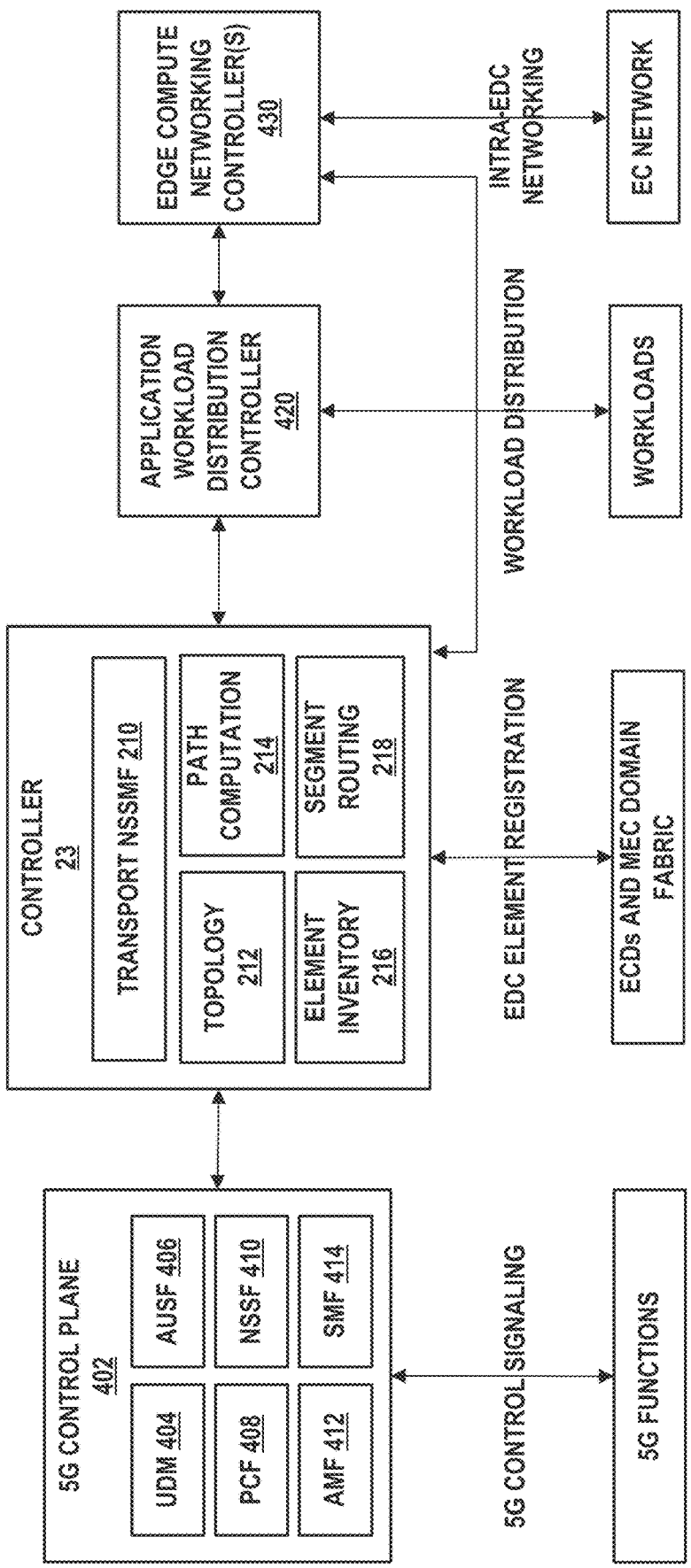
FIG. 4 is a block diagram illustrating controller interactions, in accordance with the techniques described in this disclosure.

FIG. 4 is a block diagram illustrating controller interactions, in accordance with aspects of the techniques described in this disclosure. In the example of FIG. 4, 5G control plane 402, controller 23, application workload distribution controller 420, and edge compute network controller 430 may be executed on the same device or executed on different devices.

In the example of FIG. 4, the 5G Control Plane 402 handles all signaling related to providing connectivity and services to 5G devices or user equipment (e.g., devices 4 of FIG. 1). 5G control plane 402 may execute control plane functions, such as Unified Data Management (UDM) 404, Authentication Server Function (AUSF) 406, Policy Control Function (PCF) 408), Network Slice Selection Function (NSSF) 410, Access and Mobility Function (AMF) 412, and Session Management Function (SMF) 414.

UDM 404 manages data of user equipment. For example, UDM 404 may generate Authentication and Key Agreement (AKA) credentials, user identification handling, access authorization based on subscription data, subscription management, and others. AUSF 406 performs authentication with user equipment. PCF 408 may manage and authorize session parameters for the IoT device including data rate, QoS and charging. NSSF 410 may establish and manage network slicing parameters for sessions with user equipment, e.g., devices 4, including the 5GC and transport domains. NSSF 410 is also used to interact with controller 23. AMF 412 is responsible for user equipment (e.g., device 4) registration management, connection management, reachability management, mobility management, and various functions relating to security and access management and authorization. SMF 414 is responsible for bearer and session management, such as bearer and session establishment, modification, and release.

As described above, controller 23 is responsible for the edge data center element registration, MEC domain topology discovery, path computations and segment routing label assignments. Controller 23 interacts with 5G control plane 402, nodes in the MEC domain fabric, Application Workload Distribution Controller (AWDC) 420 and the Edge Compute Networking Controllers ("ECNC") 430.

Application Workload Distribution Controller 420 is responsible for workload scheduling and distribution within the Edge Computing environments in the EDCs (e.g., to replicate the application on metro data center 30 to an edge compute of an EDC). Edge Compute Networking Controllers 430 may represent software defined networking (SDN) controllers responsible for networking within the edge computing environments (e.g., group of containers called a pod), including the support for segment routing. Segment routing may be supported directly on network interface cards (e.g., SmartNICs) of the edge compute servers. This allows for end-to-end segment routing traffic processing regardless of the user equipment and EC workload IP addressing.

As one example operation, a user equipment, e.g., device 4, performs attachment and authentication and registration procedures to connect to radio access network 8. An operator (e.g., Mobile Network Operator (MNO)) of the 5G Control Plane performs functions for attachment of the device 4. For example, AMF 412 performs attachment procedures. UDM 404 performs subscriber identification or authentication. PCF 408 performs policy execution, 5G QoS Flow identification (QFI) and parameter selection. AMF 412 or SMF 414 performs node mapping and selection of DU, CU and UPF (the UPF selection may be influenced by controller 23) for the device, and 5G QoS Flow ID (QFI) assignment for the traffic class required for the device. NSSF 410 sends request for optimized edge routing to controller 23. The request may include a Traffic Class ID, CU ID, UPF ID, and QFI. In some examples, the CU ID and UPF ID matches the MEC domain element IDs registered by the agent to controller 23. For example, the CU ID may be used to identify the source EDC for the path selection as well as for the identification of where to schedule the EC workload. NSSF 410 may use MP-BGP or a REST API to send the request to controller 23.

Controller 23 identifies a valid path record within the best set of constraints to satisfy the traffic class requirements received from the NSSF 410. Controller 23 responds to NSSF 410 with a response with the segment routing label stacks for the mobile elements: CU and UPF computed for the user equipment session.

NSSF 410 communicates to the SMF 414 the optimized edge routing information. The SMF 414 may replace the original UPF selected for the device 4 during the initial node selection procedure with the UPF corresponding to the UPF Node SID received from controller 23 based on the path computation results from path computation module 214. This is a way to influence the UPF node selection based on the path routing with the MEC domain. In other words, this is how the workload routing/scheduling can influence where the mobile traffic can terminate optimally relative to the workload location.

The SMF 414 is expected to signal the segment routing label stack information along with the mobile session parameters for the device 4 to the CU and the UPF elements. The segment routing labels may be used by the CU and UPF in the same way as GPRS Tunneling Protocol User Plane (GTP-U) Tunnel Endpoint Identifiers (TEIDs) are used to manage the packet switching in GTP-U.

The segment routing label stack communicated from controller 23 to NSSF/SMF/CU/UPF is used to handle the traffic in the Uplink direction. The CU is expected to use the UPF Node SID label for packets on the interface (e.g., N3 interface between the radio access network 8 and UPF) toward the UPF. The CU may use SRv6. The UPF is expected to use the remaining SR/SRv6 label stack in the packets on the interface (e.g., N6 interface between data network and UPF) toward the MEC domain fabric router in the EDC (e.g., MEC domain fabric router 202C of FIG. 2), which may then process the segment routing label stack and send the packets upstream toward the MEC domain fabric.

Controller 23 communicates the EC node identity to the Application Workload Distribution Controller (AWDC) 420. This allows the AWDC 420 to activate application specific workload worker(s) on the compute infrastructure of the selected EC node.

Controller 23 communicates the downlink segment routing label stack to the selected EC node or to the EC Network Controller 430 (e.g., an SDN controller responsible for networking in the EC compute container/pod). The EC node networking stack (running on the compute OS itself or on the SmartNIC, or on the EC networking fabric) may support segment routing or segment routing IPv6.

The EC networking stack is expected to insert the received segment routing label stack into packets going in the downlink direction toward the MEC domain fabric. The nodes of the MEC domain fabric, including the MEC domain fabric router in the EDC, may process the packets in accordance to the segment routing label stack carried in the packets and deliver packets to the corresponding UPF in the associated EDC. The UPF is expected to receive segment routing packets on the interface (e.g., N6 interface between the data network and UPF), process the label stack, insert the CU Node SID label and send the packets on the interface (e.g., N3 interface between radio access network 8 and UPF) toward the CU. The CU is expected to receive the segment routing packets, discard the label stack and process the packets in accordance with the downlink procedures toward the DU or remote radio head (RRH).

The effect of the above procedure is the programming of an optimized edge routing path from the UE to the Edge Compute workload based on the traffic class requirements of the corresponding application. The above procedure provides a mapping between the 5G QFI for the UE by the mobile network operator policy control function and the traffic class that needs to be transported in the EDC/packet/optical network (the MEC domain Fabric) on an optimized path computed by controller 23 within the MEC domain. This procedure can be repeated for any required QFI, for example the QFI associated with the high data rate class (e.g., class 1) or any other defined QFI/Class combination.

Figure 5:
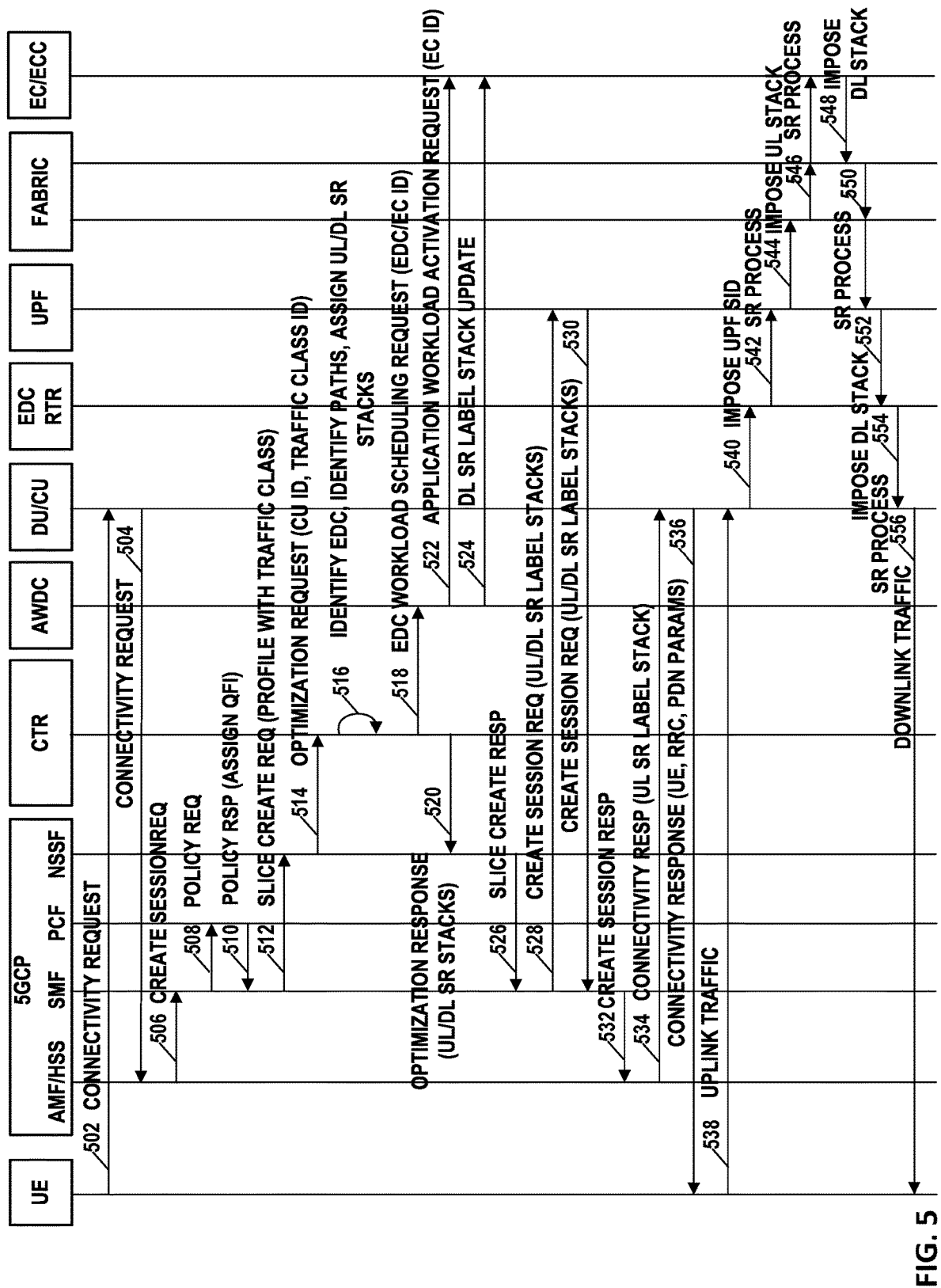
FIG. 5 is a flowchart illustrating an example operation to provide network defined edge routing within a given MEC domain, in accordance with the techniques described in this disclosure.

FIG. 5 is a flowchart illustrating an example operation to provide network defined edge routing for an application workload within a given MEC domain, in accordance with the techniques described in this disclosure.

A device 4 sends a connectivity request to an edge data center (e.g., edge data center 22A) (502). DU/CU of edge data center 22A sends connectivity request to AMF/HSS of 5GC (504).

In response to receiving the connectivity request, AMF/HSS creates a session request (e.g., SessionReq) to SMF (506). SMF sends a policy request to PCF (508). PCF then sends a policy response (assign QFI) to SMF (510). In response, SMF sends a request to create a network slice (e.g., profile with traffic class) to NSSF (512).

NSSF sends a request for an optimized edge routing path to controller 23 (514). For example, the request may include a CU ID and a Traffic Class ID. Controller 23 identifies an edge data center, identifies one or more paths, and assigns uplink (UL)/downlink (DL) segment routing stacks (516). Controller 23 then sends a request for EDC/EC workload scheduling (518). For example, the request includes an EDC identifier and EC identifier. Controller 23 sends a response including the segment routing label stacks to NSSF 410 of the 5GC (520) and an application workload activation request including the EC identifier (522). Controller 23 sends the downlink segment routing label stack update to an old edge compute of edge data center 22A (524).

NSSF 410 of 5GC sends a slice update response (e.g., DL/UL segment routing label stacks) to SMF (526). In response, SMF sends an update session request (e.g., DL/UL segment routing label stacks) to a new UPF of the edge data center 22A (528). UPF of the edge data center 22A sends a response to the update session request to SMF of 5GC (530).

SMF sends a response to the session request (e.g., SessionReq in step 506) (532). AMF sends a connectivity response (e.g., UL segment routing label stack) to DU/CU of edge data center 22A (534). DU/CU of edge data center 22A sends a connectivity response (Radio Resource Control (RRC) and packet data network (PDN) parameters to devices 4 (536).

In this way, when device 4 sends traffic to the DU/CU of edge data center 22A (uplink traffic) (538), DU/CU of edge data center 22A imposes a UPF segment identifier (SID) (540) and sends the packet to an edge data center fabric router, which processes the packet according to the segment routing label stack and sends the packet to the UPF (542). The UPF imposes an uplink label stack (544) to the MEC domain fabric router. The MEC domain fabric router processes the packet according to the segment routing label stack and sends the packet through the fabric of the MEC domain 21 (546).

The edge compute may receive the packet and sends traffic back to the IoT device 4. For example, the edge compute may impose a downlink segment routing stack to the packet (548) and sends the packet through the fabric of the MEC domain 21. The MEC domain fabric router receives the packet, processes the packet according to the segment routing label stack (550), and sends the packet to the UPF. The UPF receives the packet and imposes a downlink segment routing label stack to the packet (552) and sends the packet to the edge data center router. The edge data center router receives the packet, processes the packet according to the segment routing label stack (554), and sends the packet to the user equipment, e.g., IoT device 4 (556).

Figure 6:
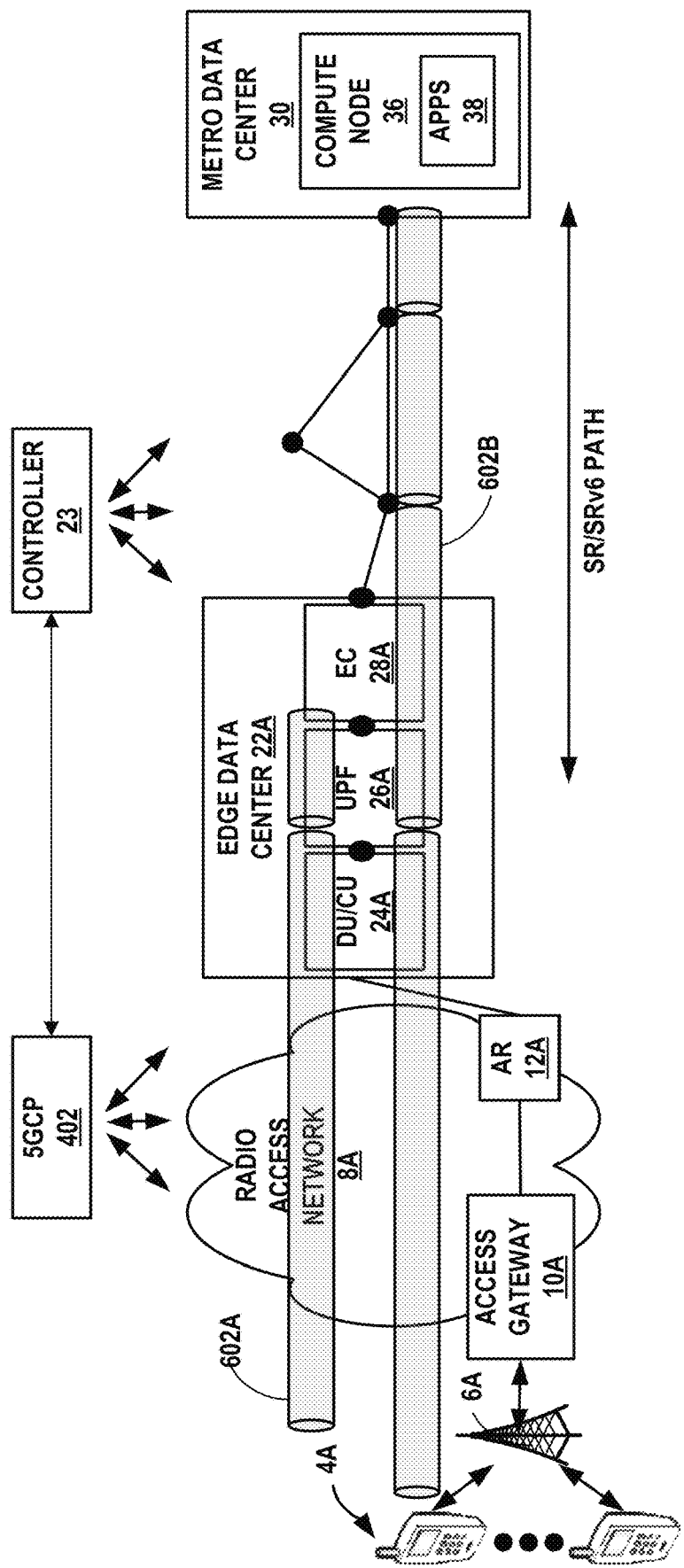
FIG. 6 is a block diagram illustrating an example in which packets from the same packet data network (PDN) session mapped to different bearers corresponding to different QFI values may be assigned different segment routing label stacks in the MEC domain, and routed to different EC resources.

FIG. 6 is a block diagram illustrating an example in which packets from the same packet data network (PDN) session mapped to different 5GC bearers (e.g., tunnels used to connect devices 4 to PDNs such as the Internet) corresponding to different QoS Flow Identifier (QFI) values may be assigned different segment routing label stacks in the MEC domain, and routed to different edge compute resources. Bearers, such as bearers 602A and 602B, are tunnels used to connect user equipment to PDNs, such as the internet.

In the example of FIG. 6, Session Management Function (SMF) of controller 23 may, for the same user equipment, e.g., device 4A, map the same PDN session to a first 5GC bearer 602A and a second 5GC bearer 602B. For example, for device 4A, a first 5G QFI on the first 5GC bearer 602A can be mapped to a first segment routing label stack for routing to a central edge compute resource, e.g., metro data center 30 of FIG. 1 (e.g., bearer 602A, QFI A, SR label stack A), while a second 5G QFI value on the second 5GC bearer 602B can be mapped to a second segment routing label stack for routing traffic to an edge compute resource located closer to the user equipment radio attachment point, e.g., edge data center 22A of FIG. 1 (e.g., bearer 602B, QFI B, SR label stack B). In other words, different segment routing label stacks can be used for each tunnel.

Figure 7:
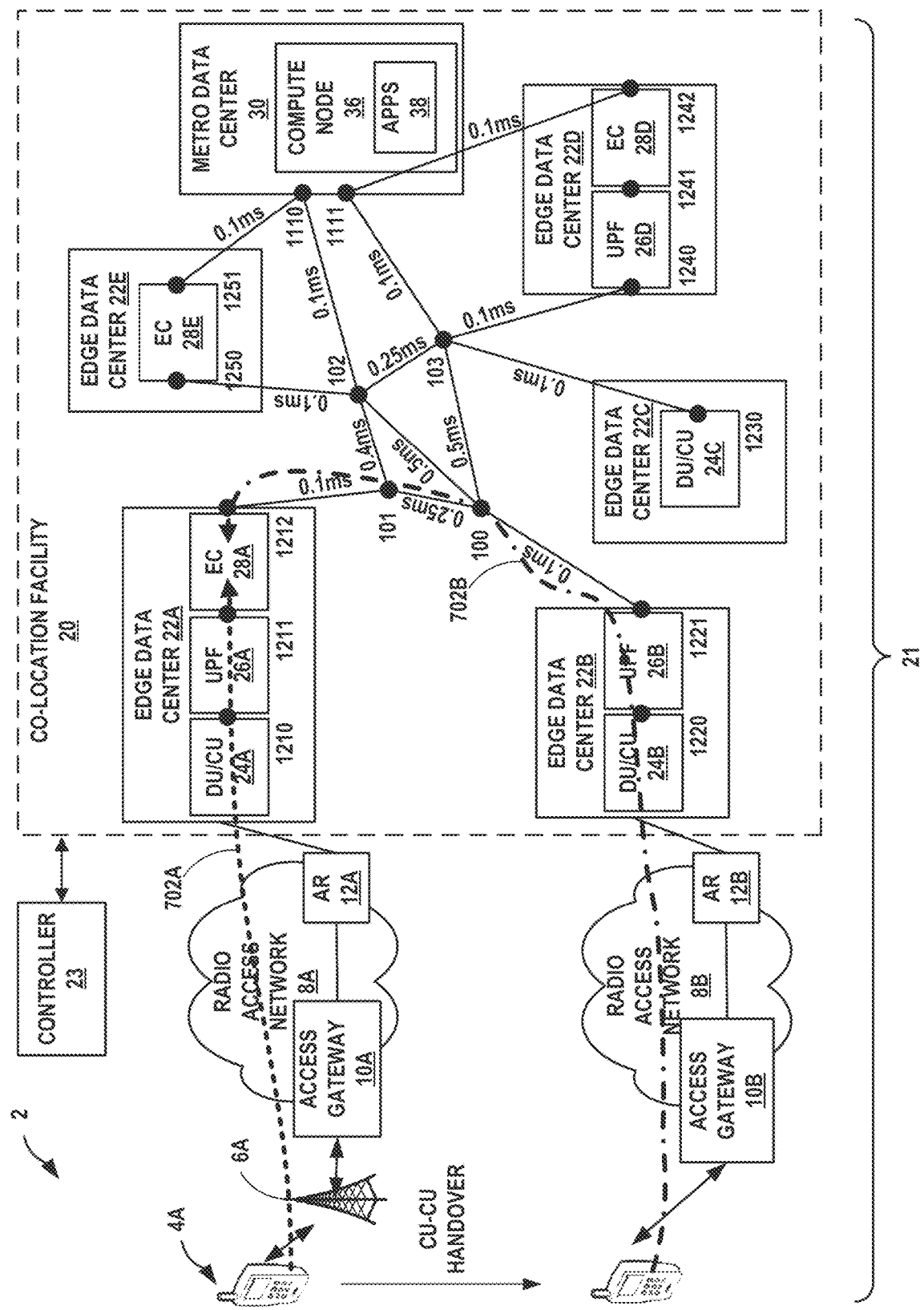
FIG. 7 is a block diagram illustrating an example inter-centralized unit handover between different edge data centers, in accordance with the techniques described in this disclosure.

FIG. 7 is a block diagram illustrating an example inter-centralized unit handover between different edge data centers, in accordance with the techniques described in this disclosure. In the example of FIG. 7, the inter-centralized unit (inter-CU) handover results in the device 4A attaching to a CU in a different edge data center, e.g., edge data center 22B, while the original active UPF and EC remain in the original edge data center, e.g., edge data center 22A.

In accordance with the techniques described in this disclosure, an inter-CU handover may occur while maintaining the IP address of device 4A, as normally, if a new UPF is used. With segment routing labels, both the uplink traffic from the new UPF to the EC resource and the downlink traffic from the EC resource to device 4A (via the new UPF) is not routed based on the IP address of device 4A but is rather based on the segment routing labels. By using segment routing labels, the downlink traffic from the EC resource to the device 4A follows the segment routing label stack to the new UPF without the need for UPF-UPF tunneling or IP address leaking arrangements (e.g., resulting from the use of Uplink Classifiers (ULC) to break out the traffic at the new UPF in order to maintain connectivity to device 4A and the original IP address), which creates a significant IP routing implication and also creates a need to maintain signal and manage the ULCs themselves which are usually based on 5-tuples, which adds to the complexity at the control plane level. The elimination of tunneling for the new path between the new CU and the new UPF and the old EC, shown as path 702B, helps route traffic in such a way as to preserve the original traffic class requirements in order to maintain the desired quality of service, for example, by eliminating an extra UPF hop/processing delay.

Figure 8:
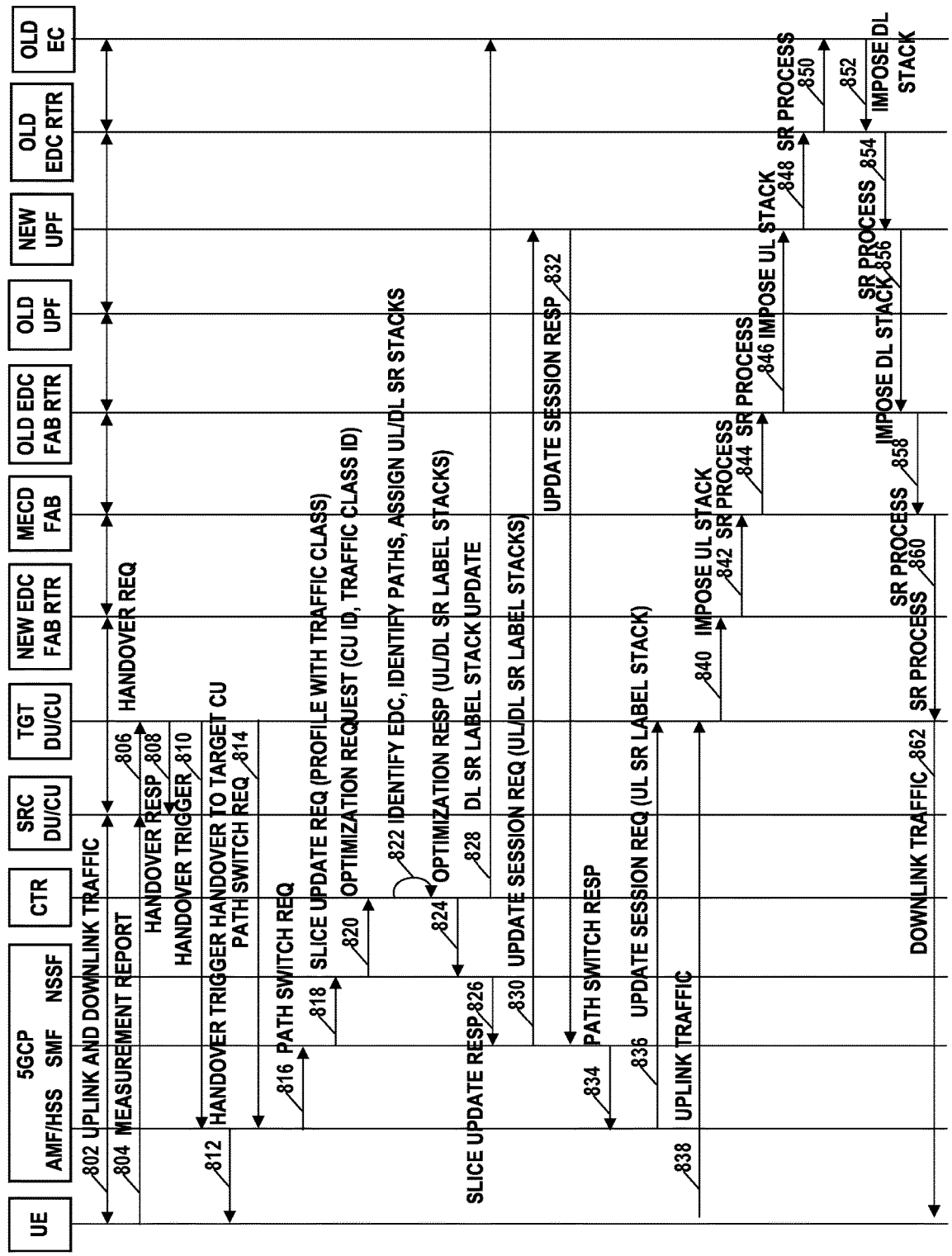
FIG. 8 is a flowchart illustrating an example operation of inter-centralized unit handover between different edge data centers, in accordance with the techniques described in this disclosure.

FIG. 8 is a flowchart illustrating an example operation of inter-centralized unit handover between different edge data centers, in accordance with the techniques described in this disclosure. The operation of inter-centralized unit (inter-CU) handover is described respect to the network described in FIG. 7. In the example of FIG. 8, uplink and downlink traffic is originally sent (802) between the user equipment (e.g., device 4A of FIG. 7) and a source CU, e.g., CU 24A of FIG. 7, of EDC 22A. To initiate an inter-CU handover to a target CU, e.g., CU 24B, in EDC 22B while the original active UPF and EC remain in EDC 22A, the user equipment (e.g., device 4A of FIG. 7), submits a Measurement Report to a source CU, e.g., CU 24A of FIG. 7, indicating the handover condition (804). The source CU 24A signals a handover request to a target CU, e.g., CU 24B (806). The target CU 24B sends a handover trigger to source CU 24A (808). In response, the source CU 24A sends a handover trigger to device 4A to attach to the target CU 24B (810).

The AMF of 5GC triggers the handover and device 4A attaches to the target CU 24B (812). At this time, the downlink traffic is still directed along the old path (e.g., path 702A) via the old UPF (e.g., UPF 26A) toward the source CU 24A. The source CU 24A buffers the downlink traffic for the device 4A. The source CU 24A forwards the downlink traffic to the traffic CU 24B on the interface between RAN nodes (e.g., Xn interface between gNB (combo of DU and CU)).

Target CU 24B sends a path switch request to the access and mobility function (AMF) of the 5GC (814). In response, the AMF sends the path switch request to the session management function (SMF) of the 5GC (816). The SMF sends a Slice Update Request to the NSSF indicating the new CU ID and the traffic class or parameters (818). The NSSF of 5GC sends the request to controller 23 asking to update the path with new segment routing labels for the best path satisfying the traffic class requirement between the target CU 24B and edge data center 22B (820). In this case, controller 23 identifies the new UPF 26B in edge data center 22B and the old EC 28A of edge data center 22A across the MEC domain 21.

Controller 23 computes the new path (e.g., path 702B) (822) and responds to the NSSF of 5GC with the new uplink and downlink segment routing label stacks (824). The NSSF signals to the SMF the new segment routing paths and labels (826). Controller 23 may send an update to the segment routing label stack to the old EC (828). The SMF updates the new UPF 26B, e.g., by sending an update session request including the uplink/downlink segment routing label stacks (830). In response to receiving the update request, UPF 26B sends an update session response to SMF (832). The SMF sends a path switch response (e.g., response to path switch request in step 816) to AMF (834). In response, the AMF updates the target CU 24B with the new uplink segment routing label stack. For example, the AMF sends an update session request (including an uplink segment routing label stack) to the target CU 24B (836).

In this way, when device 4A sends uplink traffic toward the target CU 24B (838), the target CU 24B imposes the uplink segment routing label stack on the packets outgoing (e.g., on an N3 interface between gNB and UPF) using segment routing or segment routing v6 (840). The target CU 24B then sends the traffic to an EDC fabric router, which processes the packet according to the segment routing label stack (842). Each of the routers in the MEC domain fabric processes the packet according to the segment routing label stack (844). The new UPF 26B may receive the packet and in response, imposes a segment routing label stack on the outgoing packet (846). The fabric router of edge data center 22B and the fabric routers in MEC domain 21 forward the uplink packets to the EDC fabric router of the original EDC 22A, which processes the packet according to the segment routing label stack (848) and sends the packet to the original EC 28A and the application workload.

In the downlink direction, the EC networking stack imposes the downlink segment routing label stack on a packet towards the new UPF 26B via the MEC domain fabric, regardless of the IP address of the device 4A (852). For example, the original EC 28A sends the traffic to the EDC fabric router of the original EDC 22A, which processes the packet according to the segment routing label stack (854). The EDC fabric router of EDC 22A imposes a downlink segment routing label stack (856) on the packet and sends the packet to the EDC fabric router of EDC 22B. The EDC fabric router of EDC 22B process the packet according to the segment routing label stack (858), and sends the packet to the target CU 24B (860). In response, the target CU 24B sends the packet to device 4A (862).

In this way, the techniques described above enable network defined edge routing that involves a "hitless" switch from the old to the new UPF without the need to reconnect the UE and change its IP address.

Figure 9:
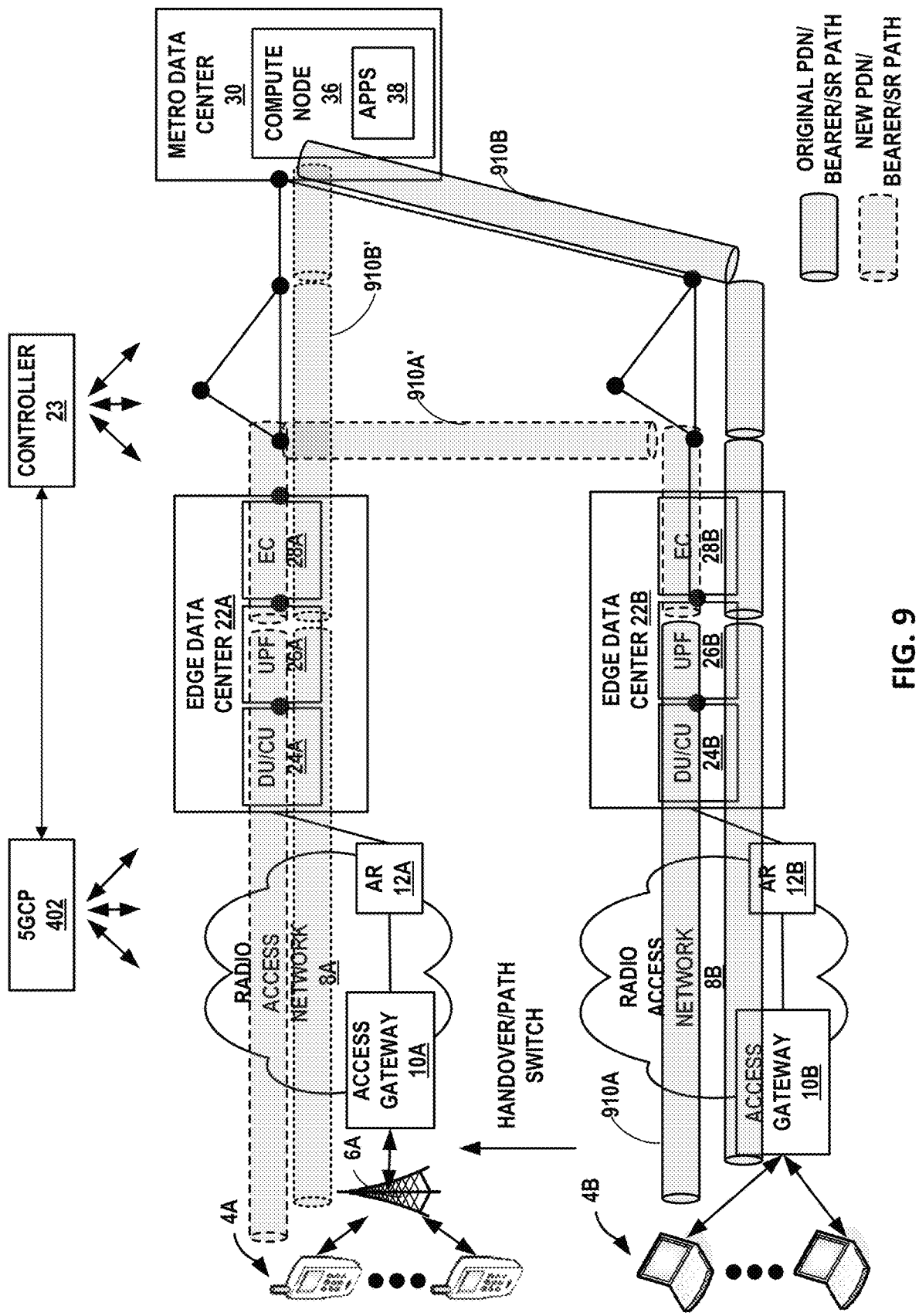
FIG. 9 is a block diagram illustrating an example inter-centralized unit handover and path switch with multiple bearers on one PDN session with segment routing path mapping to different EC resources, in accordance with the techniques described in this disclosure.

FIG. 9 is a block diagram illustrating an example inter-centralized unit (inter-CU) handover and path switch with multiple bearers on one PDN session with segment routing path mapping to different EC resources, in accordance with the techniques described in this disclosure.

FIG. 9 illustrates one example scenario where the original PDN session has two Bearers, e.g., bearers 910A and 910B, mapped to two different SR/SRv6 label stacks for handling two traffic classes on two different EC resources—one in the local edge data center (e.g., EC 28A of EDC 22A) and the second one in the Macro DC (e.g., compute node 36 of metro data center 30), respectively. The interaction between the 5GCP 402 and controller 23 results in the PDN and Bearer Path Switch to the new UPF and the coordinated uplink/downlink SR label stack update mapped to both bearers to route traffic to the original EC resources along the most optimal new paths in the MECD Fabric.

For example, 5GCP 402 and controller 23 may cause a PDN and Bearer Path handover/switch from an original bearer 910A to a new bearer 910A'. In this example, 5GCP 402 and controller 23 may switch from UPF 26B in EDC 22B to UPF 26A in EDC 22A and map the coordinated uplink/downlink SR label stack update (e.g., computed by controller 23 as described in this disclosure) to new bearer 910A' to route traffic to an original edge compute, e.g., EC 28B, along the most optimal new path 910A' in the MECD fabric.

Similarly, 5GCP 402 and controller 23 may cause a PDN and Bearer Path handover/switch from an original bearer 910B to a new bearer 910B'. In this example, 5GCP 402 and controller 23 may switch from UPF 26B in EDC 22B to UPF 26A in EDC 22A and map the coordinated uplink/downlink SR label stack update (e.g., computed by controller 23 as described in this disclosure) to new bearer 9103 to route traffic to an original edge compute, e.g., EC 28B, along the most optimal new path 9103 in the MECD fabric. Note that the PDN Path Switch takes place without the user equipment disconnecting and assignment of a new IP address.

Figure 10:
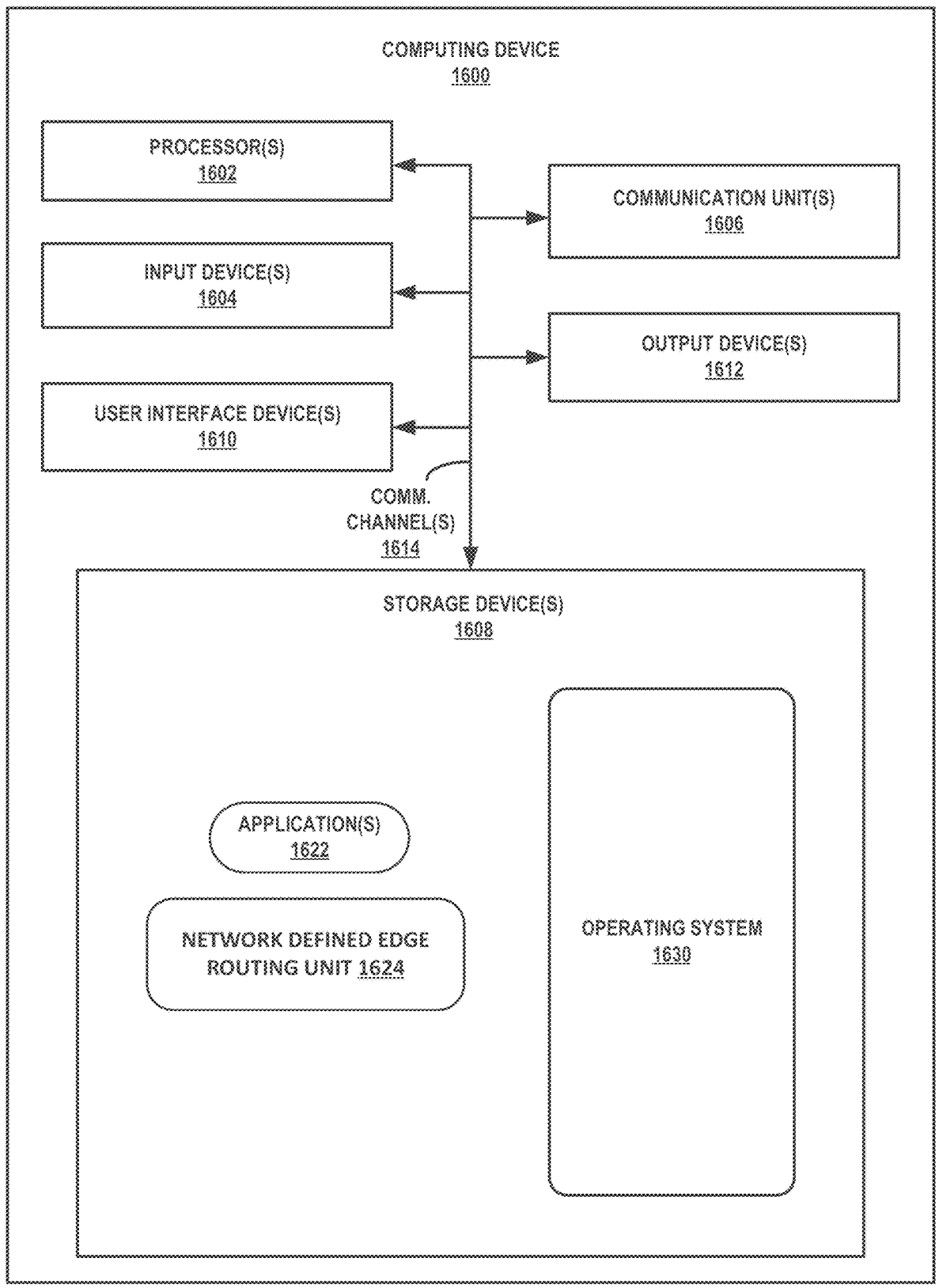
FIG. 10 is a block diagram illustrating further details of one example of a computing device that operates in accordance with one or more techniques of the present disclosure.

FIG. 10 is a block diagram illustrating further details of one example of a computing device that operates in accordance with one or more techniques of the present disclosure.

FIG. 10 may illustrate a particular example of a server or other computing device 1600 that includes one or more processor(s) 1602 for executing a controller (e.g., controller 23 of FIGS. 1-9), or any other computing device described herein. Other examples of computing device 1600 may be used in other instances. Although shown in FIG. 10 as a stand-alone computing device 1600 for purposes of example, a computing device may be any component or system that includes one or more processors or other suitable computing environment for executing software instructions and, for example, need not necessarily include one or more elements shown in FIG. 10 (e.g., communication units 1606; and in some examples components such as storage device(s) 1608 may not be co-located or in the same chassis as other components).

As shown in the example of FIG. 10, computing device 1600 includes one or more processors 1602, one or more input devices 1604, one or more communication units 1606, one or more output devices 1612, one or more storage devices 1608, and user interface (UI) device(s) 1610. Computing device 1600, in one example, further includes one or more application(s) 1622, Network Defined Edge Routing Unit 1624, and operating system 1630 that are executable by computing device 1600. Each of components 1602, 1604, 1606, 1608, 1610, and 1612 are coupled (physically, communicatively, and/or operatively) for inter-component communications. In some examples, communication channels 1614 may include a system bus, a network connection, an inter-process communication data structure, or any other method for communicating data. As one example, components 1602, 1604, 1606, 1608, 1610, and 1612 may be coupled by one or more communication channels 1614.

Processors 1602, in one example, are configured to implement functionality and/or process instructions for execution within computing device 1600. For example, processors 1602 may be capable of processing instructions stored in storage device 1608. Examples of processors 1602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1608 may be configured to store information within computing device 1600 during operation. Storage device 1608, in some examples, is described as a computer-readable storage medium. In some examples, storage device 1608 is a temporary memory, meaning that a primary purpose of storage device 1608 is not long-term storage. Storage device 1608, in some examples, is described as a volatile memory, meaning that storage device 1608 does not maintain stored contents when the computer is turned off. Examples of volatile memories include random access memories (RAM), dynamic random access memories (DRAM), static random access memories (SRAM), and other forms of volatile memories known in the art. In some examples, storage device 1608 is used to store program instructions for execution by processors 1602. Storage device 1608, in one example, is used by software or applications running on computing device 1600 to temporarily store information during program execution.

Storage devices 1608, in some examples, also include one or more computer-readable storage media. Storage devices 1608 may be configured to store larger amounts of information than volatile memory. Storage devices 1608 may further be configured for long-term storage of information. In some examples, storage devices 1608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1600, in some examples, also includes one or more communication units 1606. Computing device 1600, in one example, utilizes communication units 1606 to communicate with external devices via one or more networks, such as one or more wired/wireless/mobile networks. Communication units 1606 may include a network interface card, such as an Ethernet card, an optical transceiver, a radio frequency transceiver, or any other type of device that can send and receive information. Other examples of such network interfaces may include 3G and WiFi radios. In some examples, computing device 1600 uses communication unit 1606 to communicate with an external device.

Computing device 1600, in one example, also includes one or more user interface devices 1610. User interface devices 1610, in some examples, are configured to receive input from a user through tactile, audio, or video feedback. Examples of user interface devices(s) 610 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1612 may also be included in computing device 1600. Output device 1612, in some examples, is configured to provide output to a user using tactile, audio, or video stimuli. Output device 1612, in one example, includes a presence-sensitive display, a sound card, a video graphics adapter card, or any other type of device for converting a signal into an appropriate form understandable to humans or machines. Additional examples of output device 1612 include a speaker, a cathode ray tube (CRT) monitor, a liquid crystal display (LCD), or any other type of device that can generate intelligible output to a user.

Computing device 1600 may include operating system 1616. Operating system 1616, in some examples, controls the operation of components of computing device 1600. For example, operating system 1616, in one example, facilitates the communication of one or more applications 1622, Network Defined Edge Routing Unit 1624 with processors 1602, communication unit 1606, storage device 1608, input device 1604, user interface devices 1610, and output device 1612.

Network Defined Edge Routing Unit 1624 may include a Segment Routing-Aware Network Software Stack (e.g. a virtual switch) or be realized on a SR-Aware Smart Network Interface Card (NIC). Network Defined Edge Routing Unit 1624 may include program instructions and/or data that are executable by computing device 1600 to perform the functions as described herein (e.g., the functions as described in FIGS. 1-5). For example, Network Defined Edge Routing Unit 1624 may include instructions that cause processor(s) 1002 of computing device 1600 to receive, via communication unit(s) 1606, element registration information for each of the modules hosted on the set of interconnected edge data centers and for one or more network devices that interconnect the modules in the network. Network Defined Edge Routing Unit 1624 may also include instructions that cause processor(s) 1002 of computing device 1600 to obtain one or more routing metrics of the network, such as, for example, by using network performance measurement protocols (e.g., OWAMP, TWAMP, SNMP, etc.) to obtain routing metrics such as latency, bandwidth, hop count, link utilization, reliability, throughput, load, packet loss, etc. Network Defined Edge Routing Unit 1624 may further include instructions that cause processor(s) 1002 of computing device 1600 to compute, based on the element registration information and the one or more routing metrics, one or more paths mapped to respective traffic classes to route traffic via the set of interconnected edge data centers. For example, Network Defined Edge Routing Unit 1624 may perform traffic engineering using segment routing mechanisms (e.g., SPRING) to compute segment routing label stacks mapped to respective traffic classes to route traffic within the MEC domain of the network. Network Defined Edge Routing Unit 1624 may also include instructions that cause processor(s) 1002 of computing device 1600 to receive a request to route traffic according to a traffic class of the respective traffic classes from a source edge data center of the set of interconnected edge data centers to a destination edge data center of the set of interconnected edge data centers. For example, computing device 1600 may receive a request via communication unit(s) 1606 and in response to receiving the request to route traffic according to the traffic class, send, via output device(s) 1612, a response to the set of interconnected edge data centers that specifies a path of the one or more paths that is mapped to the traffic class to cause the set of interconnected edge data centers to route traffic according to the traffic class.

Figure 11:
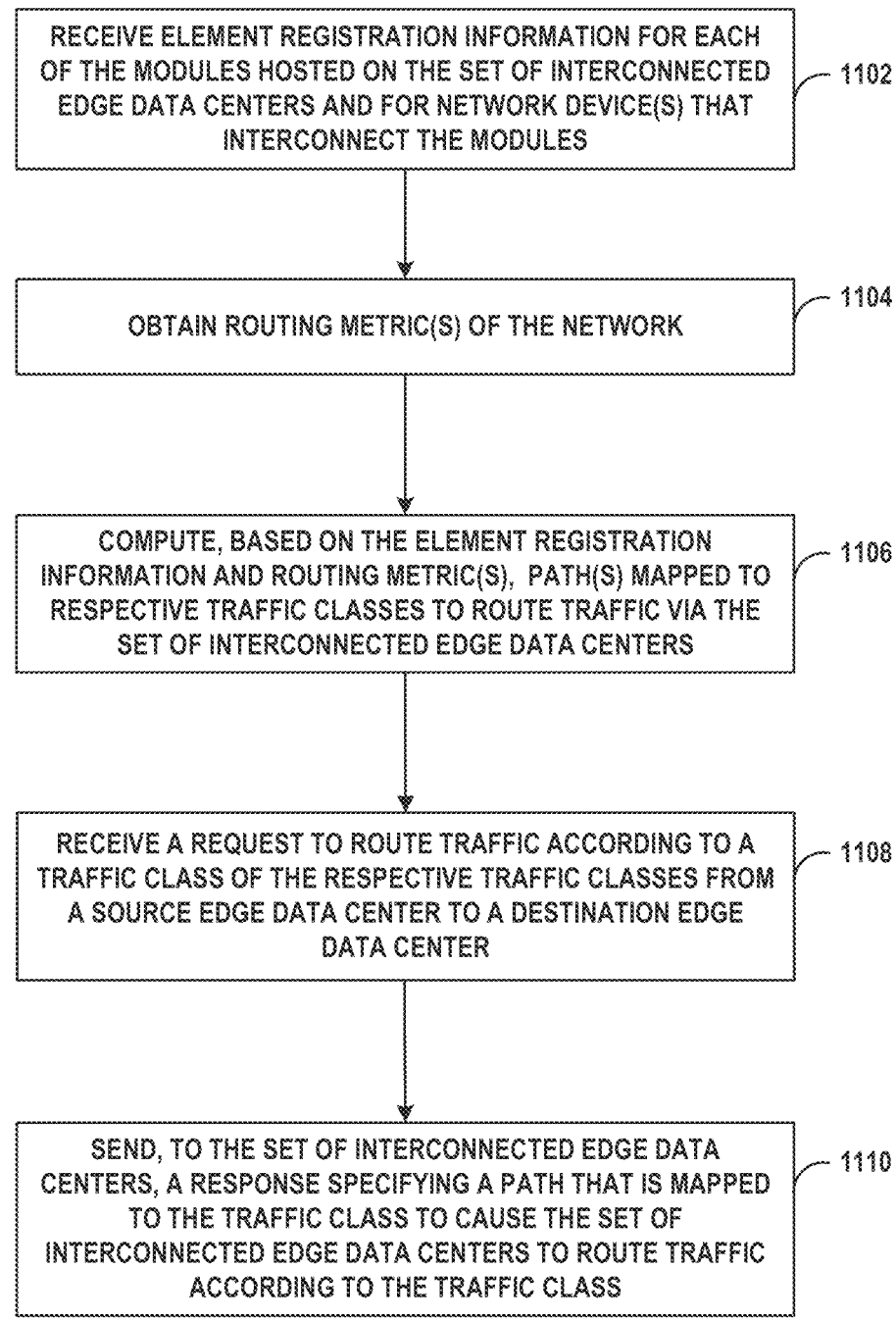
FIG. 11 is a flowchart illustrating an example operation of a controller of the network to provide network defined edge routing for an application workload, in accordance with the techniques described in this disclosure.

FIG. 11 is a flowchart illustrating an example operation of a controller of the network to provide network defined edge routing for an application workload, in accordance with the techniques described in this disclosure. For ease of illustration, FIG. 11 is described with respect to network 2 of FIG. 1 and FIG. 7, and controller 23 of FIG. 2.

Controller 23 receives, for network 2 comprising a metropolitan area data center 30 and a set of interconnected edge data centers 22, element registration information for each of the modules hosted on the set of interconnected edge data centers and for one or more network devices that interconnect the modules in the network (1102). For example, controller 23 may receive element registration information for one or more radio access network (RAN) functions (e.g., DU/CU 24), one or more 5G core functions (e.g., UPF 26), and one or more edge computing functions (e.g., EC 28) for an application workload.

In response to receiving the edge data center (EDC) element registration information, the element inventory module 216 of controller 23 may generate an EDC element registration record for each of the EDCs in the MEC domain. The EDC element registration record may include an identifier for a particular EDC and segment routing identifiers (e.g., node SIDs) assigned to the registered elements within the EDC. For example, controller 23 includes an element inventory module 216 that assigns segment routing segment identifiers (e.g., node SID) for each of the registered elements.

Controller 23 may obtain one or more routing metrics of the network (1104). For example, controller 23 may obtain metrics such as latency, bandwidth, hop count, link utilization, reliability, throughput, load, packet loss, etc. Controller 23 may also identify path parameters of the interconnection fabric 20, such as span latencies, capacity (i.e., bandwidth), protection state, and others.

Based on the element registration information and the one or more routing metrics, controller 23 computes one or more paths mapped to respective traffic classes to route traffic via the set of interconnected edge data centers (1106). For example, controller 23 may include topology module 212 that is responsible for topology discovery of MEC domain 21, path computation module 214 to compute paths within the MEC domain, and segment routing module 218 for segment routing label assignments (as described above). The topology module 212 of controller 23 may, for example, use routing protocols (e.g., Border Gateway Protocol (BGP), Interior Gateway Protocol (IGP) or other routing protocols) to determine the topology of the interconnection fabric 20. The path computation module 214 of controller 23 may compute paths that meet traffic class requirements. For example, path computation module 214 of controller 23 may collect network fabric path information based on the link and routing metrics between the packet and optical domains. Using the EDC element registration record and the collected link and routing metrics, path computation module 214 of controller 23 may compute paths within the MEC domain that meet expected performance bounds. For example, path computation module 214 of controller 23 may use, for example, Constrained Shortest Path First (CSPF) or other path computation algorithms. The paths may be defined by a stack of labels (e.g., segment identifiers) from EDC element registration record. Path computation module 214 of controller 23 may also generate a traffic class mapping structure that maps traffic classes (e.g., low latency class or high data rate class) to one or more computed paths contained within expected performance bounds and within the MEC domain. For example, path computation module 214 of controller 23 may define traffic classes, each including one or more paths defined by a label stack of segment identifiers from the EDC element registration record.

Controller 23 receives a request to route traffic according to a traffic class of the respective traffic classes from a source edge data center of the set of interconnected edge data centers to a destination edge data center of the set of interconnected edge data centers (1108).

For example, Network Slice Selection Management Function (NSSMF) module 210 of controller 23 may manage and orchestrate network slice selection instances (NSSI) for a particular device. For example, NSSMF module 202 of controller 23 may receive a request to provide network defined edge routing for an application workload that includes a traffic class identifier, DU/CU identifier, UPF identifier, and QoS flow identifier (QFI).

In response to receiving the request to route traffic according to the traffic class, controller 23 sends, to the set of interconnected edge data centers 22, a response specifying a path of the one or more paths that is mapped to the traffic class to cause the set of interconnected edge data centers to route traffic according to the traffic class (1110). For example, NSSMF module 210 of controller 23 may respond to the request to provide network defined edge routing for an application workload with a segment routing label stack from the traffic class mapping structure.

The techniques described herein may be implemented in hardware, software, firmware, or any combination thereof. Various features described as modules, units, elements or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following examples.

What is claimed is:

1. A method comprising:
   receiving, by a controller for a network comprising a metropolitan area data center and a set of interconnected edge data centers, element registration information for each of the modules hosted on the set of interconnected edge data centers and for one or more network devices that interconnect the modules in the network, wherein the set of interconnected edge data centers host modules providing one or more radio access network (RAN) functions, one or more $5^{th}$ Generation of Mobile Networks (5G) core functions, and one or more edge computing functions for an application workload;
   obtaining, by the controller, one or more routing metrics of the network;
   computing, by the controller and based on the element registration information and the one or more routing metrics, one or more paths mapped to respective traffic classes to route traffic via the set of interconnected edge data centers;
   receiving, by the controller, a request to route traffic according to a traffic class of the respective traffic classes from a source edge data center of the set of interconnected edge data centers to a destination edge data center of the set of interconnected edge data centers; and
   in response to receiving the request to route traffic according to the traffic class, sending, by the controller and to the set of interconnected edge data centers, a response specifying a path of the one or more paths that is mapped to the traffic class to cause the set of interconnected edge data centers to route traffic according to the traffic class.

2. The method of claim 1, wherein the routing metrics of the network comprises at least one of latency, bandwidth, hop count, link utilization, reliability, throughput, load, and packet loss.

3. The method of claim 1, wherein the routing metrics of the network comprises path parameters of an optical network comprising at least one of span latencies, capacities, and protection states.

4. The method of claim 1, wherein the set of interconnected edge data centers is configured as a domain of the one or more edge computing functions.

5. The method of claim 1, wherein the RAN functions comprise at least one of Centralized Unit, Distributed Unit, and Baseband Unit.

6. The method of claim 1, wherein the 5G core functions comprises at least one of User Plane Function, Access and Mobility Function, Session Management Function, Policy Control Function, and Network Slice Selection Function.

7. The method of claim 1, wherein computing the one or more paths comprises:
   computing a first path to route traffic from a device to an edge computing function of the one or more edge computing functions hosted on a first edge data center of the set of interconnected edge data centers; and
   computing a second path to route traffic from the device to an edge computing function hosted on the metropolitan area data center.

8. The method of claim 7, further comprising:
   computing, by the controller and for a same packet data network session, a first bearer mapped to the first path and a second bearer mapped to the second path,
      wherein the first bearer is mapped to a first segment routing label stack of and a first Quality of Service Flow Identifier, and
      wherein the second bearer is mapped to a second segment routing label stack and a second Quality of Service Flow Identifier.

9. The method of claim 1, wherein computing the one or more paths mapped to respective traffic classes comprises:
   in response to receiving the element registration information, assigning, by the controller, a segment identifier for each of the modules hosted on the set of interconnected edge data centers, and for each of the one or more network devices that interconnect the modules in the network; and
   generating, by the controller and from the segment identifiers, one or more segment routing label stacks mapped to the respective traffic classes to route traffic via the set of interconnected edge data centers.

10. The method of claim 9, further comprising:
    generating, by the controller, an element registration information record for each edge data center of the set of interconnected edge data centers, wherein the element registration information record comprises an identifier for a respective edge data center, the segment identifier for each module hosted on the respective edge data center, and the segment identifier for each network device hosted on the respective edge data center.

11. The method of claim 1, wherein the path comprises an original path that routes traffic from a device to an edge computing function in an original edge data center via an original centralized unit in the original edge data center, further comprising:
    in response to the device attaching to a target centralized unit of a second edge data center instead of the original centralized unit in the first edge data center, receiving, by the controller, a request to update the original path to route traffic from the device to the first edge computing function in the first edge data center via a target centralized unit in a second edge data center, in response to receiving the request to update the path, sending, by the controller and to the second edge data center, an update response including an updated path that is mapped to the traffic class to cause the target centralized unit in the second edge data center to route traffic from the device to the first edge computing function in the first edge data center.

12. The method of claim 11, wherein sending the update response including the updated path comprises sending the update response including a segment routing label stack to cause the target centralized unit in the second edge data center to encapsulate traffic with the segment routing label stack to route the traffic from the device to the first edge computing function.

13. The method of claim 11, computing, by the controller and for a same packet data network session, a first bearer mapped to the original path to route traffic from the device to the first edge computing function in the first edge data center, and a second bearer mapped to the updated path to route traffic from the device to the first edge computing function in the first edge data center.

14. A method comprising:

sending, by an edge data center of a plurality of edge data centers in a network, element registration information for each of the modules hosted on the edge data center, and for each network device hosted on the edge data center, wherein the plurality of edge data centers host modules providing one or more radio access network (RAN) functions, one or more $5^{th}$ Generation of Mobile Networks (5G) core functions, and one or more edge computing functions for an application workload;

receiving, by the edge data center and from a controller of the network, one or more paths that are mapped to respective traffic classes, wherein the one or more paths are computed based on the element registration information and one or more routing metrics of the network; and in response to receiving a packet that is to be routed according to a traffic class of the respective traffic classes, sending, by the edge data center, the packet along a path of the one or more paths that is mapped to the traffic class.

15. The method of claim 14, wherein the set of interconnected edge data centers is configured as a domain of the one or more edge computing functions.

16. The method of claim 14, wherein the RAN functions comprise at least one of Centralized Unit, Distributed Unit, and Baseband Unit.

17. The method of claim 14, wherein the 5G core functions comprise at least one of User Plane Function, Access and Mobility Function, Session Management Function, Policy Control Function, and Network Slice Selection Function.

18. The method of claim 14, wherein receiving the one or more paths that are mapped to respective traffic classes comprises receiving one or more segment routing label stacks that are mapped to the respective classes.

19. The method of claim 14, wherein the path comprises an original path that routes traffic from a device to an edge computing function in an original edge data center via an original centralized unit in the original edge data center, further comprising:

in response to the device attaching to a target centralized unit of the edge data center instead of the original centralized unit in the original edge data center, receiving, by the edge data center and from the controller, an updated path that is mapped to the traffic class to cause the target centralized unit in the edge data center to route traffic from the device to the edge computing function in the original edge data center.

20. A system comprising:

metropolitan area data center of a network configured to provide an application workload;

a set of interconnected edge data centers of the network, wherein the set of interconnected edge data centers host modules providing one or more radio access network (RAN) functions, one or more $5^{th}$ Generation of Mobile Networks (5G) core functions, and one or more edge computing functions for the application workload; and a controller of the network configured to:

receive element registration information for each of the modules hosted on the set of interconnected edge data centers and for one or more network devices that interconnect the modules in the network;

obtain one or more routing metrics of the network;

compute, based on the element registration information and the one or more routing metrics, one or more paths mapped to respective traffic classes to route traffic via the set of interconnected edge data centers;

receive a request to route traffic according to a traffic class of the respective traffic classes from a source edge data center of the set of interconnected edge data centers to a destination edge data center of the set of interconnected edge data centers; and in response to receiving the request to route traffic according to the traffic class, send, to the set of interconnected edge data centers, a response specifying a path of the one or more paths that is mapped to the traffic class to cause the set of interconnected edge data centers to route traffic according to the traffic class.

* * * * *